(12) United States Patent
Eubanks et al.

(10) Patent No.: US 12,333,324 B2
(45) Date of Patent: Jun. 17, 2025

(54) FOCUS SYNCHRONIZATION ACROSS INCOMPATIBLE OPERATING SYSTEMS

(71) Applicant: MICROSOFT TECHNOLOGY LICENSING, LLC, Redmond, WA (US)

(72) Inventors: Nick Eubanks, Redmond, WA (US); Zarana Kiran Desai, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 358 days.

(21) Appl. No.: 17/846,820

(22) Filed: Jun. 22, 2022

(65) Prior Publication Data
US 2023/0376336 A1    Nov. 23, 2023

Related U.S. Application Data

(60) Provisional application No. 63/344,505, filed on May 20, 2022.

(51) Int. Cl.
*G06F 9/455*    (2018.01)
*G06F 9/445*    (2018.01)

(52) U.S. Cl.
CPC .......... *G06F 9/45558* (2013.01); *G06F 9/445* (2013.01); *G06F 9/45545* (2013.01);
(Continued)

(58) Field of Classification Search
CPC .. G06F 9/45558; G06F 9/445; G06F 9/45545; G06F 9/45554; G06F 2009/4557; G06F 2009/45575; G06F 2009/45579
See application file for complete search history.

(56) References Cited

U.S. PATENT DOCUMENTS 9,317,195 B1 *  4/2016  Grechishkin ....... G06F 3/04842
9,400,801 B1 *  7/2016  Aplemakh ............ G06F 16/183
(Continued)

FOREIGN PATENT DOCUMENTS

WO    WO-2012090072 A1 *  7/2012  ............... G06F 8/38
WO         2019217196 A2     11/2019

OTHER PUBLICATIONS

Chen, et al., "Duet Exploring Joint Interactions on a Smart Phone and a Smart Watch", In Proceedings of the SIGCHI Conference on Human Factors in Computing Systems, Apr. 26, 2014, pp. 159-168.
(Continued)

*Primary Examiner* — Dong U Kim
(74) *Attorney, Agent, or Firm* — David W. Foster; Newport IP, LLC

(57) ABSTRACT

The techniques disclosed herein synchronize focus between two operating systems that run concurrently. A proxy application running on a primary operating system (OS) presents a guest application running in a secondary OS as if it was native to the primary OS. User interface events received by the proxy application are forwarded to the corresponding guest application. Each OS independently identifies which application currently has focus. When the primary OS is focused on a proxy application, focus is synchronized by setting and maintaining the focus of the secondary OS to the corresponding guest application. When the primary OS is not focused on a proxy application, the focus of the secondary OS is set to a stub placeholder application. Keeping focus synchronized prevents user interface events received by the proxy application from being forwarded to the wrong application on the secondary OS.

20 Claims, 22 Drawing Sheets

(52) U.S. Cl.
CPC .. *G06F 9/45554* (2013.01); *G06F 2009/4557* (2013.01); *G06F 2009/45575* (2013.01); *G06F 2009/45579* (2013.01)

(56) References Cited

U.S. PATENT DOCUMENTS

| | | |
|---|---|---|
| 10,848,568 B1 | 11/2020 | Ozerov |
| 12,124,692 B2 | 10/2024 | Niu |
| 2009/0070687 A1* | 3/2009 | Mazzaferri ............. G06F 9/542 715/751 |
| 2013/0290867 A1* | 10/2013 | Massand ................ G09G 5/003 715/750 |
| 2016/0294918 A1* | 10/2016 | Walline ............... G06F 21/6218 |
| 2018/0365032 A1* | 12/2018 | Zeng ........................ G06F 9/451 |
| 2020/0275048 A1 | 8/2020 | Fu et al. |
| 2021/0216342 A1 | 7/2021 | Ohara |
| 2022/0365761 A1* | 11/2022 | Shin .................... H04N 21/431 |
| 2023/0034967 A1 | 2/2023 | Nathwani |
| 2023/0281016 A1 | 9/2023 | Neiger |
| 2023/0376337 A1 | 11/2023 | Eubanks |

OTHER PUBLICATIONS

"International Search Report and Written Opinion Issued in PCT Application No. PCT/US23/012979", Mailed Date: May 9, 2023, 13 Pages.

"International Search Report and Written Opinion Issued in PCT Application No. PCT/US23/013463", Mailed Date: May 8, 2023, 12 Pages.

Non-Final Office Action mailed on Feb. 14, 2025, in U.S. Appl No. 17/852,145, 31 Pages.

* cited by examiner

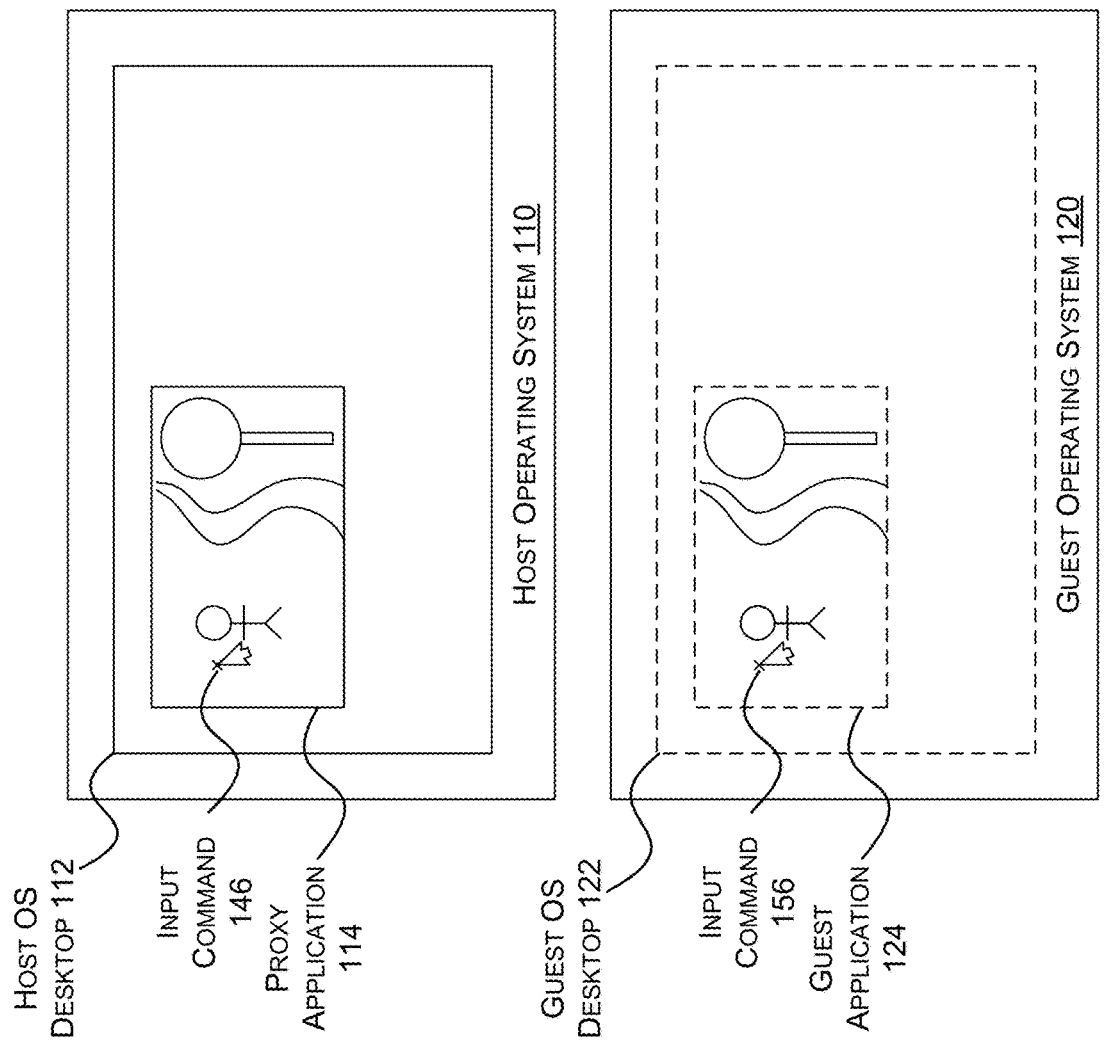

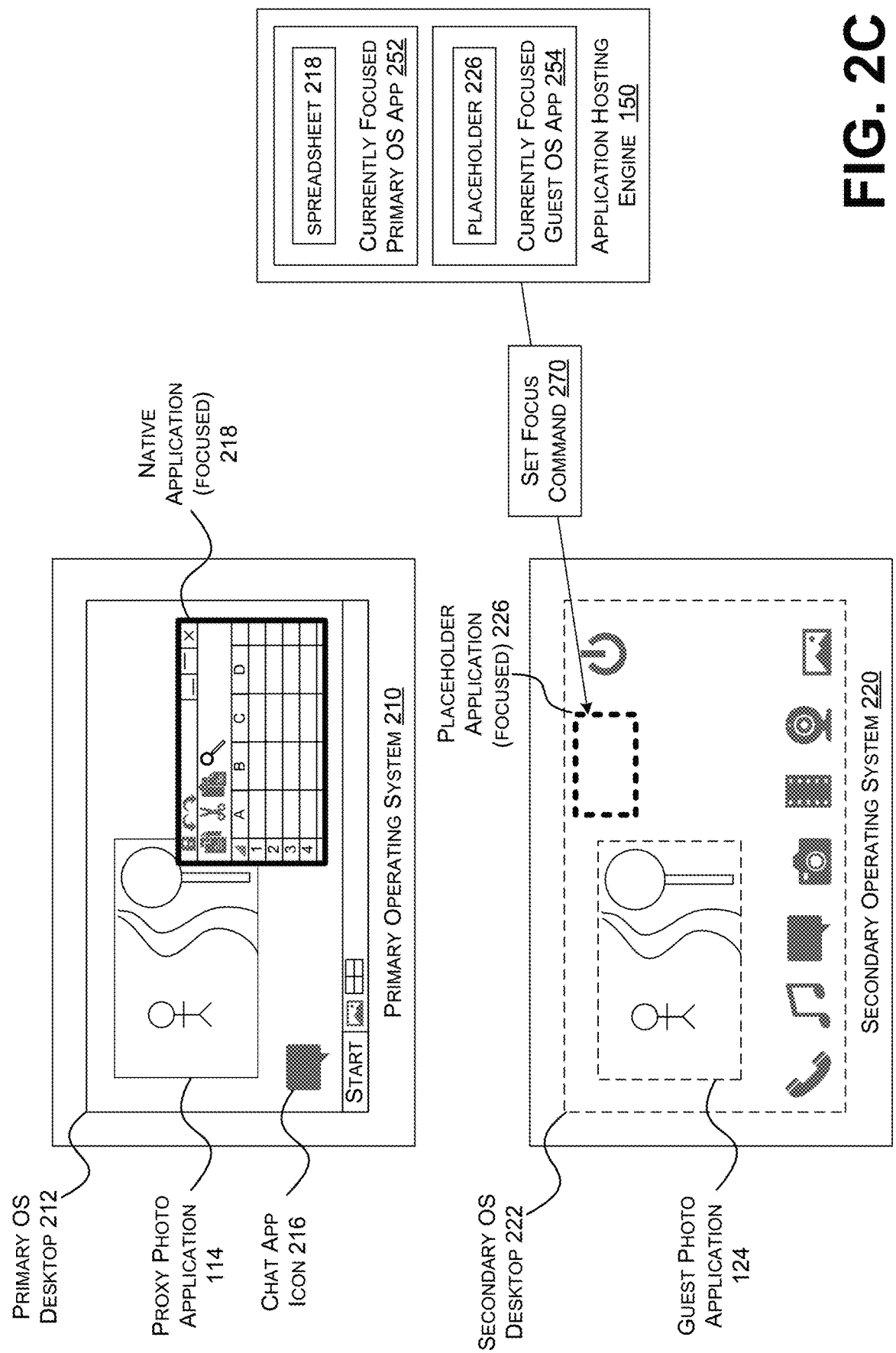

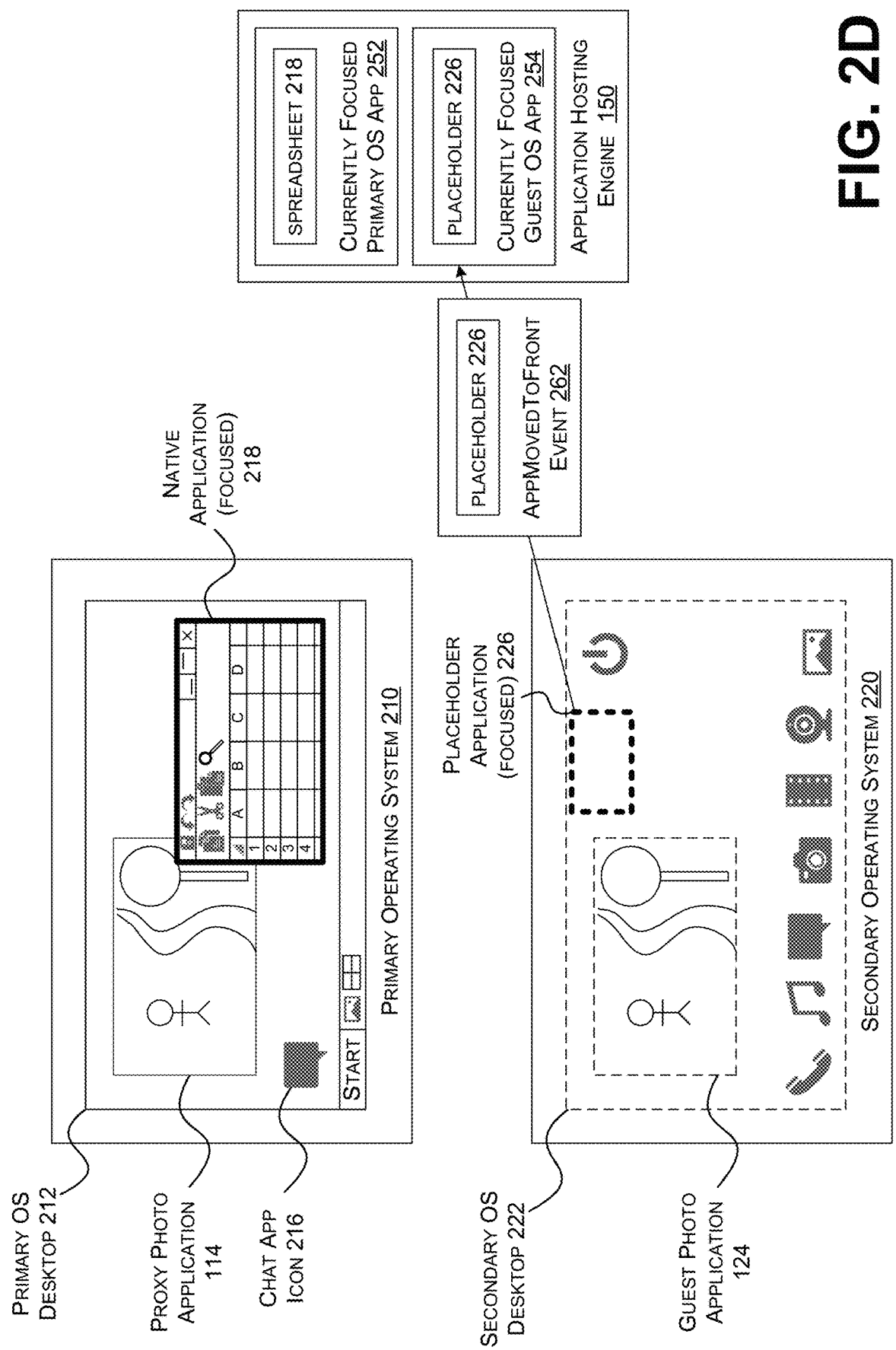

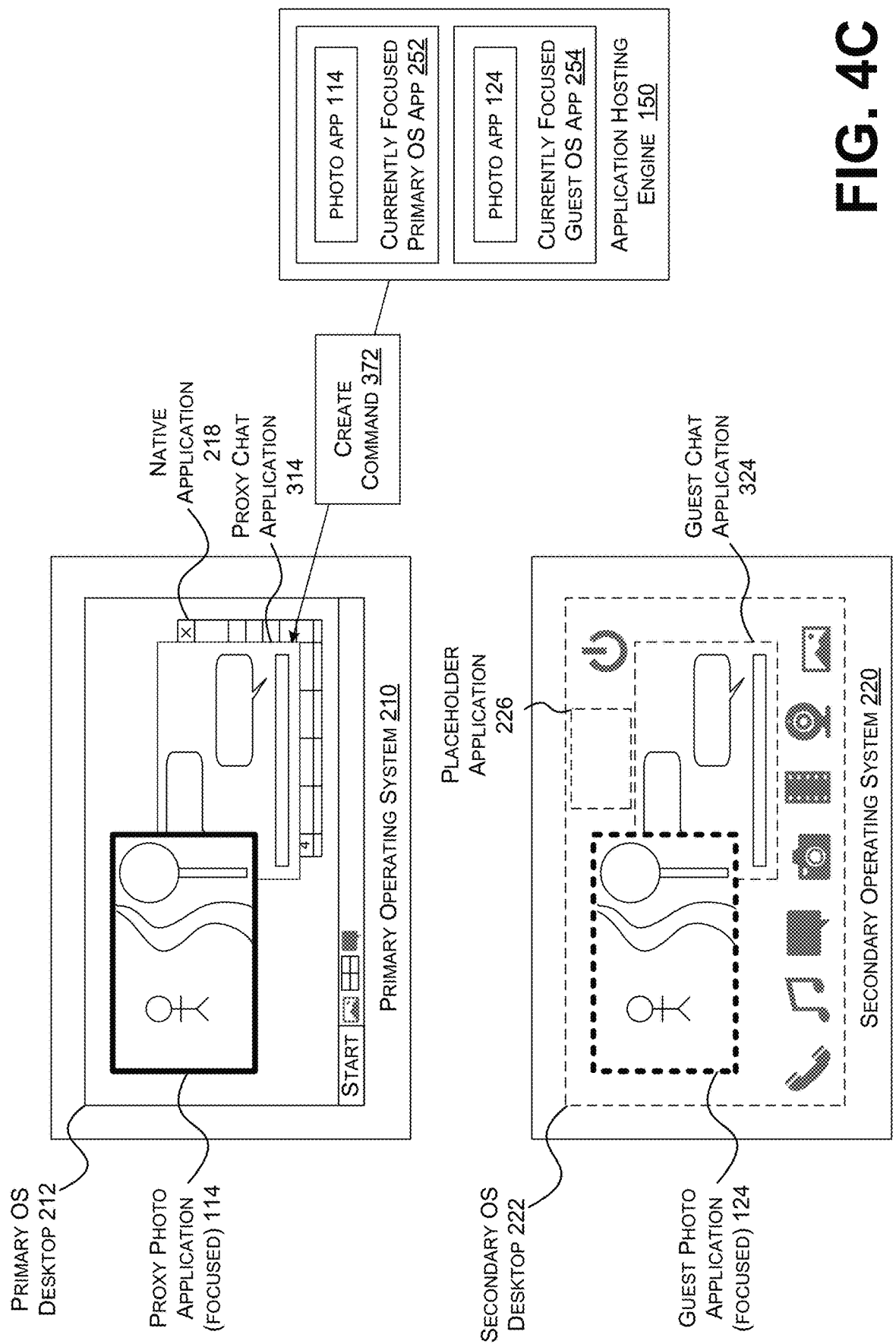

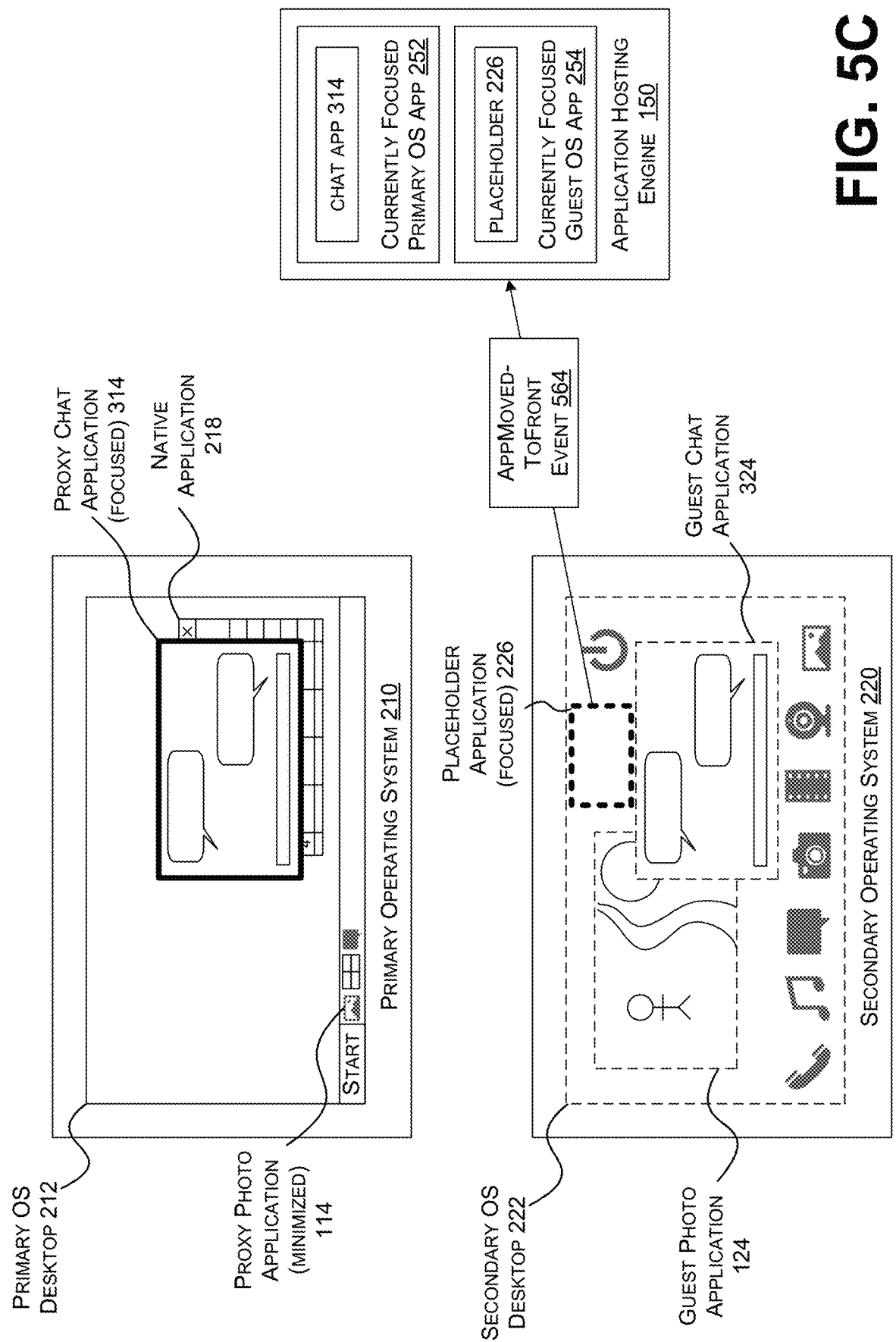

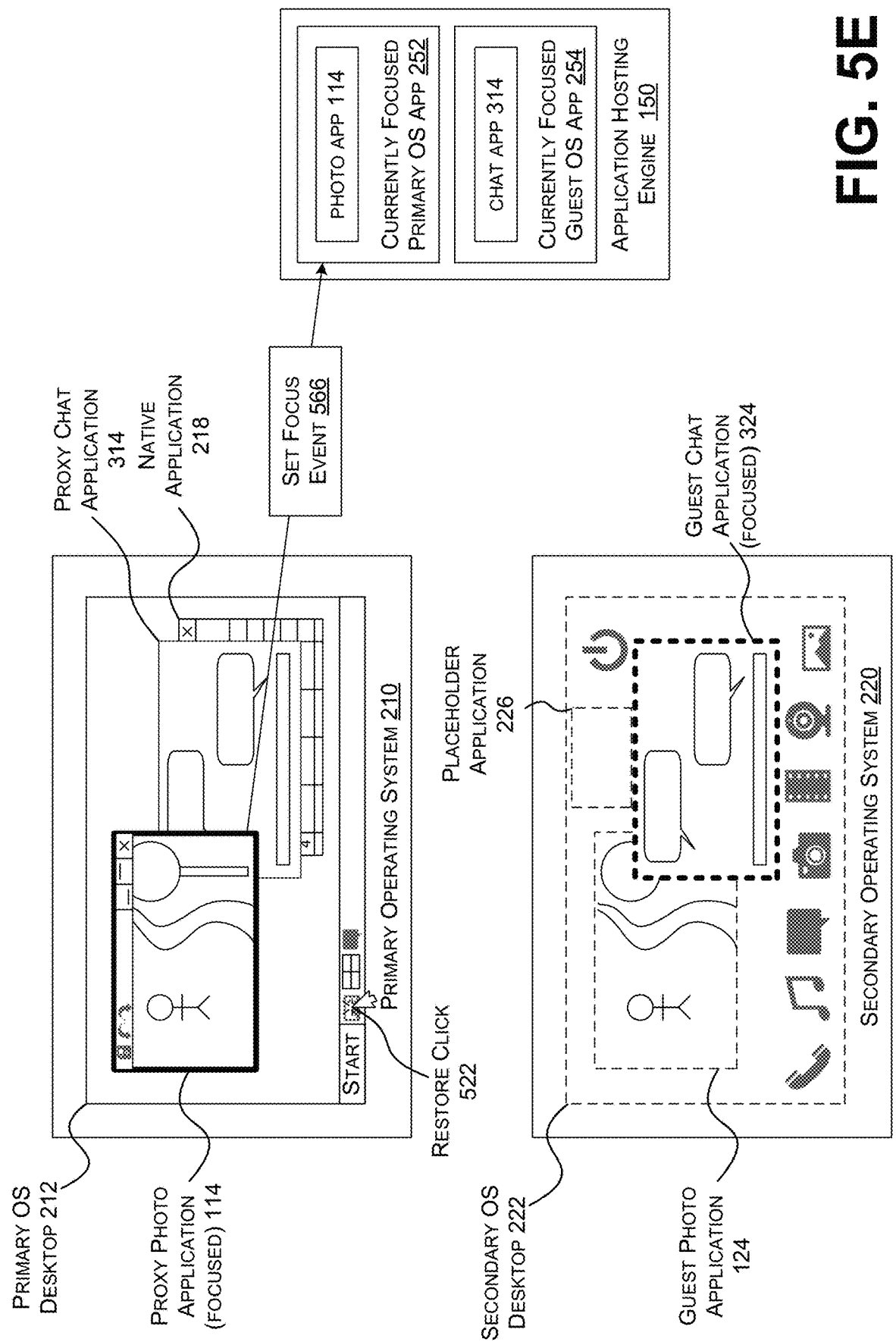

FOCUS SYNCHRONIZATION ACROSS INCOMPATIBLE OPERATING SYSTEMS

PRIORITY APPLICATION

The present application is a non-provisional application of, and claims priority to, U.S. Provisional Application Ser. No. 63/344,505 filed on May 20, 2022, the contents of which are hereby incorporated by reference in their entirety.

BACKGROUND

Native software applications are written for a single operating system (OS) and do not automatically run on other operating systems. For example, an application written for ANDROID does not automatically run on WINDOWS. However, there are many advantages to running applications designed for different operating systems simultaneously on the same operating system. Running applications from different operating systems allows interactions between applications that would otherwise be impossible. For example, a user may be able to "drag and drop" content between a WINDOWS application and an ANDROID application if the applications were simultaneously running in the same desktop in a compatible way. Another advantage includes simply increasing the number of available applications that can run on a particular operating system. For example, when migrating a business from an ANDROID platform to a WINDOWS platform, a native WINDOWS version of a legacy ANDROID application may not be available, so it would be desirable to seamlessly and naturally run the legacy ANDROID application on a WINDOWS device.

Virtual machines (VMs) and emulators allow a guest operating system to execute on the same computing device as a host operating system. However, applications in the host operating system and the guest operating system do not typically interoperate as well as two applications designed for the same operating system. For example, even if cut and paste is enabled between native applications and guest applications, drag and drop may not be. Furthermore, applications running on different operating systems operate differently and may appear differently to users. For example, application appearances may be different due to different OS-provided "chrome"—e.g., borders, menus, and other OS-provided user interface (UI) components. Applications may also operate differently due to different UI idioms and conventions. For example, cut and paste is performed with different keyboard combinations on WINDOWS and MACOS. Using an application running in an emulator or virtual machine also degrades the user experience by bringing the guest OS's entire desktop into view when switching to the guest application, unnecessarily occluding part of the host OS's desktop.

It is with respect to these and other considerations that the disclosure made herein is presented.

SUMMARY

The techniques disclosed herein synchronize focus between two operating systems that run concurrently. A proxy application running on a primary operating system (OS) presents a guest application running in a secondary OS as if it was native to the primary OS. User interface events received by the proxy application are forwarded to the corresponding guest application. Each OS independently identifies which application currently has focus. When the primary OS is focused on a proxy application, focus is synchronized by setting and maintaining the focus of the secondary OS to the corresponding guest application. When the primary OS is not focused on a proxy application, the focus of the secondary OS is set to a stub placeholder application. Keeping focus synchronized prevents user interface events received by the proxy application from being forwarded to the wrong application on the secondary OS.

In some configurations, the primary OS and the secondary OS operate concurrently on the same computing device. For example, the computing device may operate a hypervisor with the primary OS as a host OS and the secondary OS as a guest OS. The focus of the primary OS controls the focus of the secondary OS, and so in this configuration the host OS determines the focus of the guest OS. An application hosting engine running on the primary OS may present the guest application in the proxy application. Specifically, the application hosting engine renders guest application content in a window of the proxy application, making the guest application appear as if it were native to the host OS. The application hosting engine also forwards user interface (UI) commands received by the proxy application to the guest application, allowing a user to control the guest application from a user interface of the host OS. As a result, the guest application appears as if it was running natively on the host OS, seamlessly integrated with applications running natively on the host OS.

In some configurations, focus is synchronized between the primary OS and the secondary OS by making the focus of the secondary OS conform to the focus of the primary OS. Deferring to the focus of the primary OS eliminates ambiguity and race conditions caused by treating both operating systems as equals or by failing to actively manage focus at all. In some configurations, UI commands forwarded to the secondary OS are received by the application that has focus. As such, maintaining a correspondence between the focus of the operating systems ensures that UI commands are forwarded from the proxy application to the correct guest application. If the focus of the secondary OS were to change, UI commands would be forwarded to the newly focused application, and the connection between the proxy application and the guest application would be broken.

One technique used to synchronize focus occurs when the proxy application gains focus in the primary OS. In response to the proxy application gaining focus in the primary OS, the application hosting engine explicitly gives focus of the secondary OS to the corresponding guest application. For example, the application hosting engine may send a command to the secondary OS to set focus to the guest application.

Another technique used to synchronize focus occurs when the proxy application loses focus to a non-proxy application. Allowing the focus of the secondary OS to remain on the guest application of the previously focused proxy application would break focus synchronization. For example, a UI event organically caused by the secondary OS would be forwarded to the guest application and processed. The UI event would be processed by the guest application as if it has focus, while user expectations are that the guest application no longer has focus. To avoid this, and other scenarios, the application hosting engine sets the focus of the secondary OS to a stub placeholder application. Giving the focus of the secondary OS to the placeholder application maintains focus synchronization and focus primacy of the primary OS.

A third technique for synchronizing focus detects when the focused application differs between the two operating systems. In some configurations, the application hosting engine registers with the secondary OS to receive a notification when an application running on the secondary OS is brought into focus. When this notification is received, the application hosting engine checks if the primary OS focus is already on a corresponding proxy application. If it is, there is nothing to do, as focus is already synchronized. However, if the primary OS is not focused on a corresponding proxy application, the application hosting engine will instruct the secondary OS to set focus according to the application currently focused by the primary OS. If the application currently focused by the primary OS is a proxy application, the application hosting engine will set the focus of the secondary OS to the corresponding guest application. If the application currently focused by the primary OS is not a proxy application—i.e. it is a native application—the application hosting engine will give the focus of the secondary OS to the placeholder application.

By synchronizing focus across the primary and secondary OS, each OS may continue to rely on the expectation that it is solely in control of a single focused application. Any confusion that might have occurred when focus moves from an application running natively on one OS to an application running natively on the other OS is removed. The resulting behavior improves human-computer interaction by meeting the expectations of a user operating applications as if they were seamlessly integrated, even if some of the applications actually run natively on a different operating system.

Further, computer programming and other resources are conserved, as in some configurations, neither operating system requires changes to take advantage of these techniques, nor do the applications running in either operating system. In other configurations, guest applications are dynamically rebuilt, at compile time or at run time, to include the disclosed functionality. Moreover, computer processing and other resources are conserved because input directed to a proxy application on the primary OS is provided to the proper guest application on the guest OS directly, without requiring additional duplicative input.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

FIG. 1C illustrates the input command of FIG. 1B as forwarded to the guest application by the application hosting engine.

FIG. 2C illustrates an application hosting engine setting the focus of the secondary OS to a placeholder application.

FIG. 2D illustrates the secondary operating system raising an event indicating that the placeholder application has moved to the front.

FIG. 4C illustrates creating a proxy chat application, without giving it focus.

FIG. 5C illustrates the placeholder application obtaining the focus of the secondary OS.

FIG. 5E illustrates click restoring the proxy photo application.

DETAILED DESCRIPTION

Figure 1A:
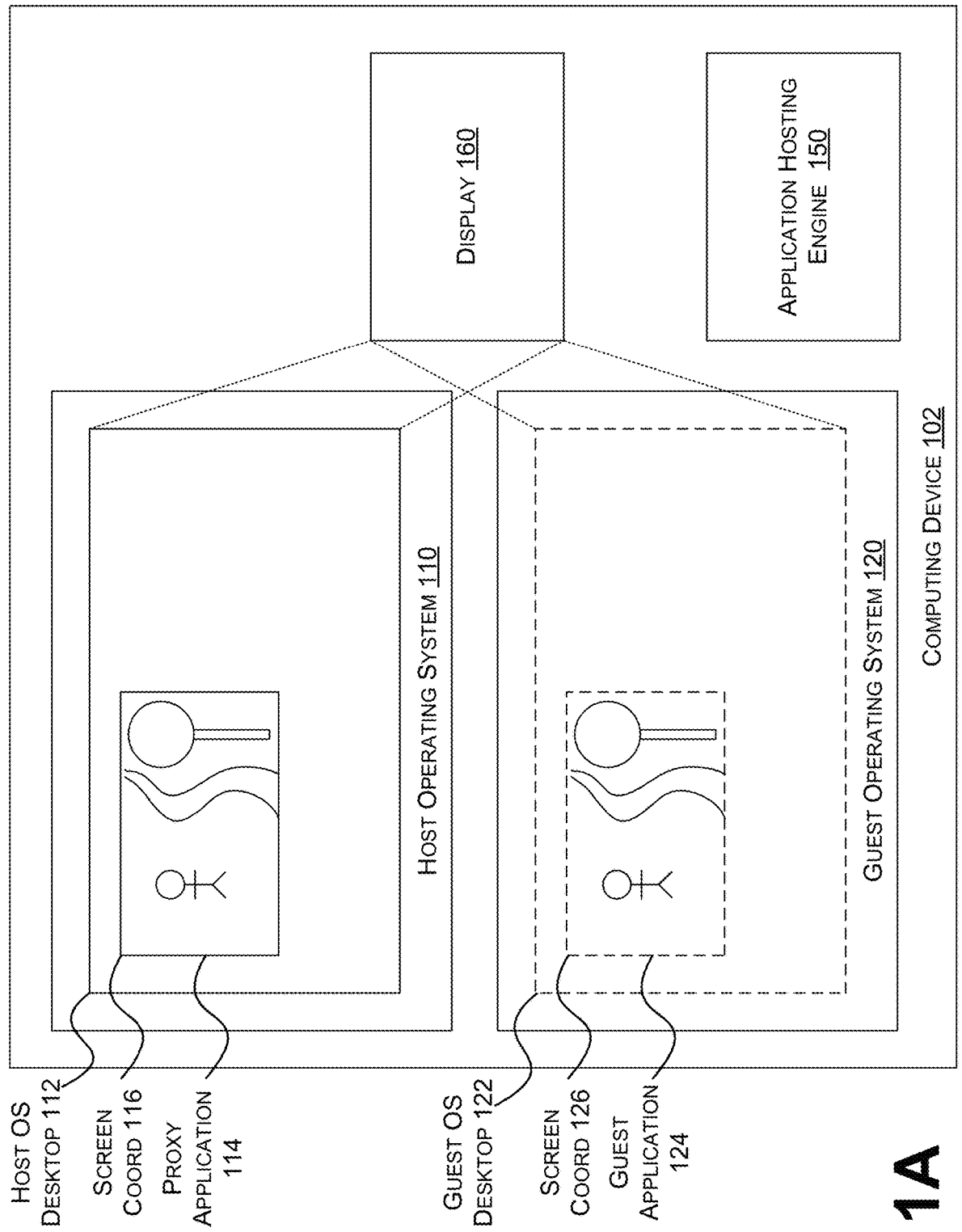
FIG. 1A illustrates an application hosting engine rendering a proxy application that contains content generated by a guest application.

To address the above and other issues, techniques have been developed to present an individual application running on a secondary operating system as if it was native to the primary operating system. For example, a secondary ANDROID-based application may be presented within a WINDOWS desktop, adopting the UI idioms of WINDOWS, interacting with other native WINDOWS applications, and otherwise acting like a native WINDOWS application. To accomplish this, the ANDROID operating system is run within a virtual machine (VM) and the ANDROID-based guest application is run in a desktop of the ANDROID VM. A proxy application is created within the WINDOWS desktop that displays the graphics rendered by the guest application. User input and other interactions with the proxy application are forwarded to the guest application.

Operating systems typically only support direct user interaction with one application at a time. Specifically, user input from a keyboard, mouse, finger, voice or other input mechanism is sent to a "focused application". The focused application may also be referred to as a foreground application or an active application, and is typically distinguished visually from background applications that do not receive user input. For example, the operating system may render a focused application with a different title bar color than non-focused applications. Setting the focus of an operating system refers to selecting which application receives user input. Throughout this document, references to a focused application also refer to a focused window, or whatever aspect of a GUI the operating system directs user input to.

However, problems can arise when two operating systems are participating together in a single application model, and each operating system expects to be in complete control over a single focused application. For example, although a proxied application in the primary OS and a corresponding guest application in the secondary OS may each be in focus in their respective OS, a pop-up may unexpectedly occur in the secondary OS, taking focus away from the guest application. When this happens, focus becomes out of sync between the two operating systems. As a result, commands sent to the secondary OS may be received by the wrong application. As referred to herein, the single application model is a number of techniques, technologies, and patterns that enable applications running in a secondary OS to be displayed and interacted with in a primary OS with the appearance and behaviors of an application that executes natively on the primary OS.

For example, if the guest application is a word processing application, and a pop-up is presented reminding the user to install a system update, the application hosting engine may be unaware of the change of focus in the secondary OS from the word processing application window to the pop-up window. As such, the application hosting engine may forward an input event from the proxy word processing application (e.g., text entry or formatting, menu selection) to the secondary OS, expecting it will be handled by the word processing application. Instead, the input event will be forwarded to the pop-up reminder, as this is the application in the secondary OS that actually has focus. Sending an input command to the wrong application may fail silently, cause data loss, or result in other unexpected behavior. Throughout this document, reference is made to input received by an application, sending input to an application, and other interactions with applications. It is understood that applications typically consist of one or more windows, and that input events are sent to and processed by windows within an application. As such, whenever reference is made to an input event interacting with an application, it is understood to also refer to an input event interacting with a window of an application.

Conversely, confusion may be caused when a guest application unexpectedly gains focus. This can happen when launching the guest application from the primary operating system. The primary OS launches the guest application by sending a "launch application" command to the secondary OS. This command is asynchronous in that as soon as it has been issued, the primary OS returns focus to the previous application that had focus. Meanwhile, the secondary OS begins launching the guest application, initializes the guest application, and provides focus to the guest application. In some configurations, the guest application renders a user interface into a buffer provided by the primary OS, which becomes visible to the user in a proxy application. However, since the focus of the primary OS already reverted back to the previous application, any user input commands will continue to be directed to the previous application and not to the proxy of the guest application that was recently launched. This can cause confusion if the user expects to interact with the recently launched application as soon as it is displayed.

This type of confusion can happen any time the secondary OS is asked to bring a first guest application into focus asynchronously—e.g., when restoring a first proxy application that has been minimized. In between the time the command is issued and the time the first guest application is brought into focus in the secondary OS, a second application in the primary OS may gain focus. If the second application is a native application, then user expectations will be met because UI commands are not forwarded from native applications, and so it does not matter when the first guest application is brought into focus on the secondary OS.

However, if the second application is a proxy application for a second guest application, the application hosting engine will tell the secondary OS to bring the second guest application into focus. The result is a race—the first guest application, which was asked to be restored asynchronously, may come into focus first, only to lose focus to the second guest application. In this case, user expectations are met, because the second application and the corresponding second guest application will both be in focus. However, it is also possible that the second guest application will come into focus first, only to lose focus to the restored first guest application. If this happens, focus synchronization is lost—i.e., the first guest application in the secondary OS will have focus while the second application will still have focus in the primary OS. As a result, input commands would be forwarded to the wrong guest application.

The techniques disclosed herein synchronize focus between two operating systems that run concurrently as part of a single application model. One of the operating systems is selected as a primary OS where focus is considered absolute. The secondary OS is then managed such that focus is reflected from the primary operating system. In some embodiments, the primary OS is a host OS and the secondary OS is a guest OS that executes on a hypervisor or other virtual machine.

One technique used to synchronize focus is to launch a stub placeholder application in the secondary OS. Then, if a native application running within the primary OS—i.e., an application with no counterpart in the secondary OS—gains focus, an application hosting engine will cause the secondary OS to give focus to the placeholder. The placeholder application may be managed exclusively by the application hosting engine, such that it cannot unexpectedly obtain focus in the secondary OS.

Another technique used to synchronize focus occurs when a proxy application gains focus in the primary OS. When this happens, the application hosting engine explicitly gives focus to the corresponding guest application.

A third technique for synchronizing focus detects when the focused application differs between the two operating systems. In some configurations, the application hosting engine registers with the secondary OS to receive a notification when an application is brought into focus. When this notification is received, the application hosting engine checks if the primary OS focus is already on a corresponding proxy application. If it is, there is nothing to do, as focus is already in sync. However, if a different application within the primary OS has focus, the application hosting engine will instruct the secondary OS to set focus to a guest application corresponding to the different application. If there is no guest application corresponding to the different application, then the placeholder application will be given focus.

By synchronizing focus across the primary and secondary OS, each OS may continue to rely on the expectation that it is solely in control of a single focused application. Any confusion that might have occurred when focus moves from an application running natively on one OS to an application running natively on the other OS is removed. Further, computer programming and other resources are conserved, as neither operating system requires changes to take advantage of these techniques, nor do the applications running in either operating system. The resulting behavior improves human-computer interaction by meeting the expectations of a user operating applications as if they were seamlessly integrated, even if some of the applications are actually run natively on a different operating system. Moreover, computer processing and other resources are conserved, as input directed to a proxy application on the primary OS is provided to the proper guest application on the secondary OS in the first instance, without requiring additional duplicative input.

FIG. 1A illustrates an application hosting engine 150 rendering a proxy application 114 that contains content generated by a guest application 124. Computing device 102 executes host operating system (OS) 110, which displays host operating desktop 112 on a display 160. Guest operating system 120 is concurrently executing on computing device 102. Guest OS 120 may be running within a hypervisor, virtual machine, emulator, or the like.

Guest OS 120 renders content to guest OS desktop 122, which is also configured to render content to display 160. As such, guest OS desktop 122 and host OS desktop 112 often have the same dimensions, resolution, and other properties. However, desktop dimensions, resolutions, and scales do not have to match in order to implement focus synchronization. Guest application 124 is running on guest OS 120. Guest application 124 renders content that would ordinarily be displayed by guest OS 120 on guest OS desktop 122. However, in order to create the impression that guest application 124 is a native application running on host OS 110 and allow increased functionality between guest application 124 and native applications running on host OS 110, application hosting engine 150 renders the content generated by guest application 124 in proxy application 114. Proxy application 114 appears on host OS desktop 112 and operates and appears as a true native application of host OS 110. In some configurations, application hosting engine 150 only renders content generated by guest OS 120 that is associated with a guest application that is proxied in host OS 110. That guest OS 120 does not actually render to display 160 is indicated by dashed lines of guest OS desktop 122 and guest application 124. In some configurations, guest OS 120 renders content to a pseudo display device that does not actually render content to a screen. In some configurations, application hosting engine 150 provides guest application 124 with a graphics buffer into which content from guest application 124 is rendered. Proxy application 114 may then use this buffer when rendering content to host OS desktop 112.

Since guest OS 120 and host OS 110 are configured to use the same display 160, screen coordinates 126 and 116 are the same. As proxy application 114 is moved around host OS desktop 112, application hosting engine 150 will move guest application 124 to the corresponding location within guest OS desktop 122. Similarly, in some embodiments, as proxy application 114 is resized within host desktop 112, application hosting engine 150 will resize guest application 124 to the same width and height. In other embodiments, application hosting engine 150 may keep guest application 124 a constant size while allowing proxy application 134 to be resized. Updating the size and location of guest application 124 in this way is referred to herein as synchronizing size and location of proxy application 114 and guest application 124.

Figure 1B:
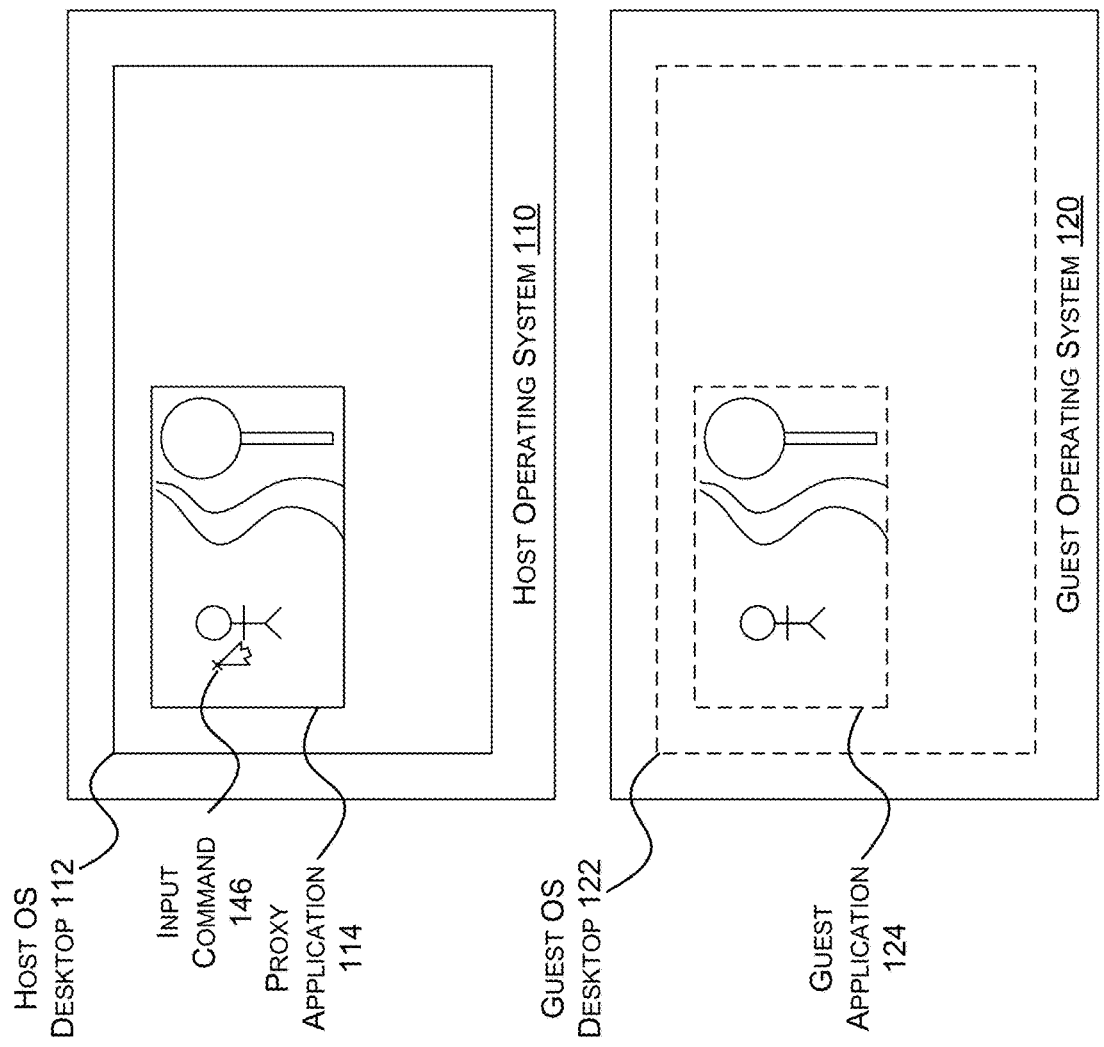
FIG. 1B illustrates an input command received by the proxy application.

FIG. 1B illustrates an input command 146 received by the proxy application 114. Input command 146 may be a mouse click, keyboard input, touch input, voice command, automation command, the invocation of an operating system user interface application programming interface (API), or any other technique for controlling the proxy application 114. Input command 146 may be the beginning of a sequence of input commands, such as a double click, drag and drop, hover, or other user interface idiom.

FIG. 1C illustrates the input command 146 as provided to the guest application 124 by the application hosting engine 150. Application hosting engine 150 provides input command 146 to guest application 124 as input command 156. Input command 156 maybe a direct copy of input command 146 or a translation to one or more corresponding input commands recognized by applications running on guest OS 120. For example, if proxy application 114 receives a mouse click event at coordinates (200, 250), application hosting engine 150 may create a mouse click event with coordinates (200, 250) but that is formatted for applications running on guest OS 120. Application hosting engine 150 may then forward the newly created event to proxy application 114. Alternatively, application hosting engine 150 may invoke an automation API, OS API, or an application-specific API to cause guest application 124 to perform a function equivalent to the function that input command 146 is expected to perform.

Figure 2A:
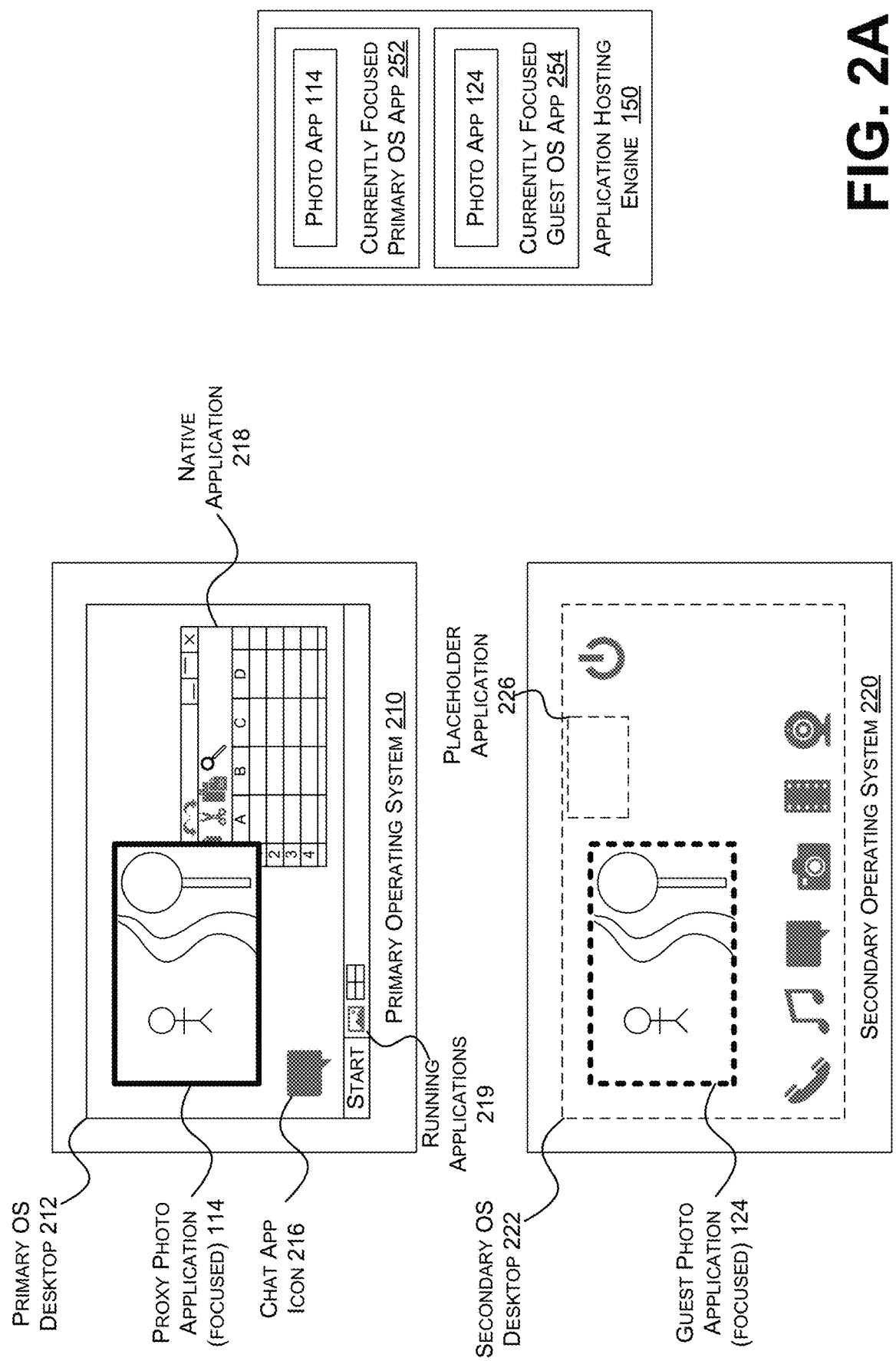
FIG. 2A illustrates a guest application and corresponding proxy application with synchronized focus.

FIG. 2A illustrates a guest photo application 124 and a corresponding proxy photo application 114 with synchronized focus. As illustrated, focus is indicated by the thick borders around proxy photo application 114 and guest photo application 124. Proxy photo application 114 executes on primary operating system desktop 212 of primary operating system 210. Primary operating system 210 may be a host operating system similar to host operating system 110 described above in conjunction with FIG. 1A. Native spreadsheet application 218 is also executing on primary OS desktop 212. Native spreadsheet application 218 executes on primary OS 210 directly, and is not a proxy application to a corresponding guest application. A taskbar 219 located at the bottom of primary OS desktop 212 contains icons of running applications.

Chat application icon 216 may be activated to launch a chat application. Chat application icon 216 may be a desktop icon or a taskbar 219 icon; or the chat application may be accessed in another manner (e.g., start menu, voice command, automation, other programmatic manipulation). If chat application icon 216 is associated with a native chat application, then activating it would simply launch the associated application. However, chat application icon 216 may be associated with a guest application that executes within secondary operating system 220. In this scenario, activating chat application icon 216 causes application hosting engine 150 to send an application launch command to secondary operating system 220. The application launch command causes secondary operating system 220 to launch a guest chat application.

Secondary operating system 220 renders secondary operating system desktop 222. Guest photo application 124 has the focus of secondary operating system 220, as indicated by the thick border. The dashed lines around guest photo application 124 indicate that the content drawn by guest photo application 124 is not rendered to the display by the guest photo application 124 directly. Instead, content drawn by the guest photo application 124 is rendered by corresponding proxy photo application 114.

Placeholder application 226 is a stub application launched by application hosting engine 150 to hold the focus of secondary operating system 220 when primary operating system 210 has given focus to a native application. This enables focus synchronization by allowing a guest application on secondary operating system 220 to have focus only when a corresponding proxy application on primary operating system 210 has focus. Placeholder application 226 does not render any content.

Application hosting engine 150 includes values associated with currently focused primary operating system application 252 and currently focused guest operating system application 254. These values hold identifiers of the applications that are currently in focus in their respective operating systems. As illustrated, photo application 114 currently has the focus of primary operating system 210, and photo application 124 currently has the focus of secondary operating system 220. These values are updated in response to events generated by the operating systems 210 and 220, as discussed in more detail below.

Figure 2B:
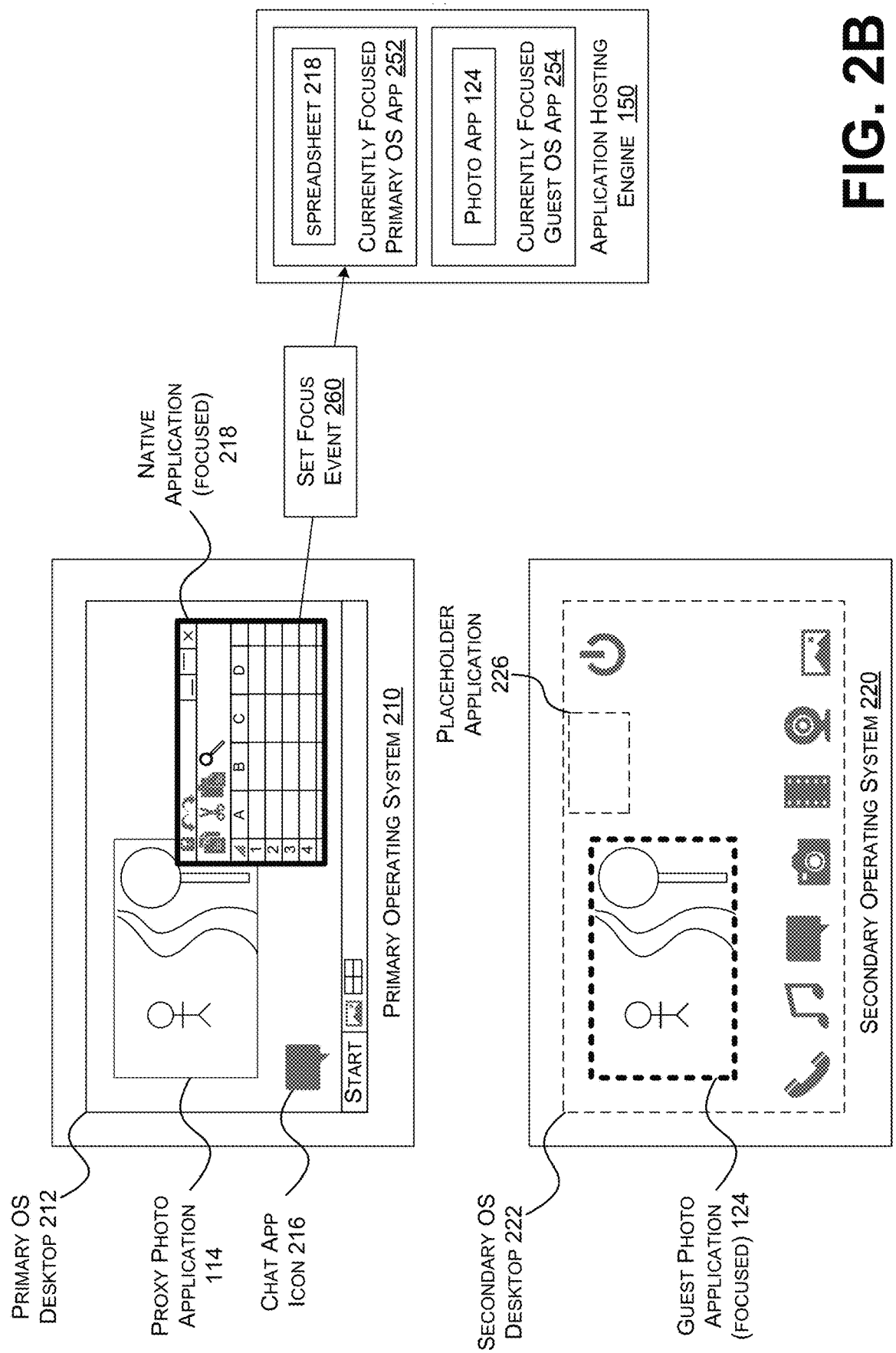
FIG. 2B illustrates shifting focus on the primary OS to an application that is native to the primary OS while focus on the secondary OS remains unchanged.

FIG. 2B illustrates shifting focus in the primary OS 210 to an application 218 that is native to the primary OS 210 while focus in the secondary OS 220 remains unchanged. Specifically, focus has shifted to native spreadsheet application 218. The focus may have shifted in response to a user input command such as a mouse click, keyboard command, voice command, touch gesture, or the like. The focus also may have shifted as a result of automation or other programmatic manipulation.

The primary operating system 210 generates set focus event 260, which application hosting engine 150 receives and uses to determine that native spreadsheet application 218 now has the focus of primary operating system 210. The value of currently focused primary OS app 252 is updated accordingly. At the time depicted by FIG. 2B, the focus of secondary operating system 220 remains on guest photo application 124. In some configurations, set focus event 260 is processed synchronously by application hosting engine 150, ensuring that changes made to the focus of secondary operating system 220 are made before a user is able to change the focus of primary OS 210 again. In other configurations, set focus event 260 is processed asynchronously by application hosting engine 150.

FIG. 2C illustrates application hosting engine 150 setting the focus of the secondary OS to a placeholder application. Specifically, application hosting engine 150 sends set focus command 270 to secondary operating system 220. In response, secondary operating system 220 gives the focus to placeholder application 226, as illustrated by the thick border around placeholder application 226. Application hosting engine 150 has also updated the value of currently focused guest OS app 254 to store an identifier of placeholder 226. Application hosting engine 150 sets the focus of secondary operating system 220 to placeholder application 226 so that the focus of the operating systems remains synchronized.

FIG. 2D illustrates the secondary operating system raising an event 262 indicating that the placeholder application 226 has moved to the front. Some operating systems use a stack metaphor for arranging applications. The application on the front of the stack is visible, occluding any other applications behind it in the stack. Applications may be moved forward or backward in the stack, or moved to the front or the back of the stack. Furthermore, these operating systems may raise events when applications are moved within the stack. Application hosting engine 150 registers to receive "AppMovedToFront" events so that it may know when an application on secondary operating system 220 has been moved to the front of the application stack—and therefore has received the focus of secondary OS 220.

As illustrated, AppMovedToFront event 262 indicates to application hosting engine 150 that placeholder application 226 has the focus of secondary OS 220. If the set focus command 270 was issued asynchronously, it is possible that the focus of primary OS 210 changed from the time the asynchronous command was given and the time that AppMovedToFront event 262 is received by application hosting engine 150. As illustrated, AppMovedToFront event 262 is received by application hosting engine 150 before any change of focus to primary OS 210. Application hosting engine 150 determines if the focus of primary OS 210 has changed. Since it has not, no further action is required and focus synchronization is maintained.

Figure 3A:
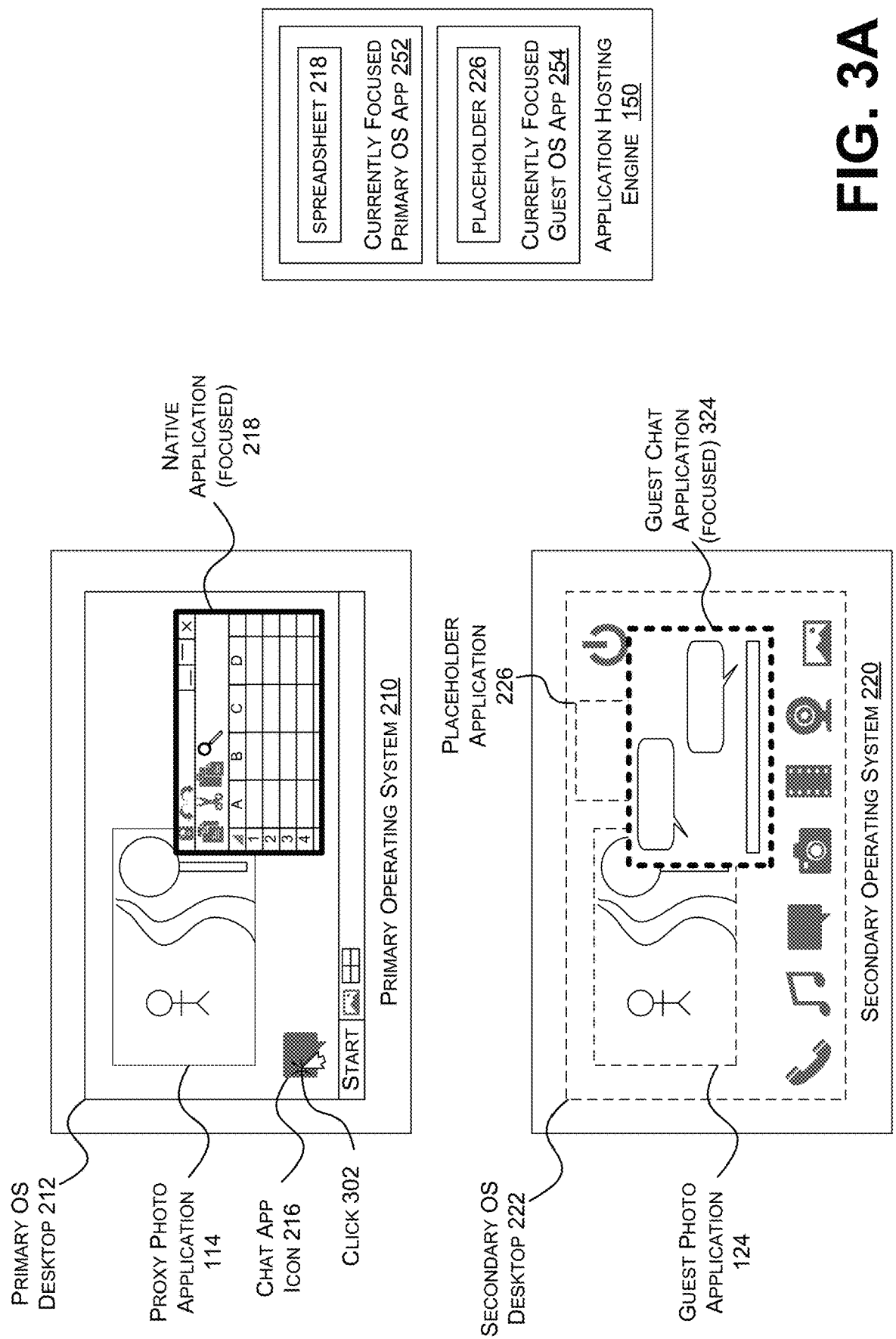
FIG. 3A illustrates a guest chat application being launched from the primary OS.

FIG. 3A illustrates a guest chat application 324 being launched from the primary OS 210. Specifically, click 302 on chat application icon 216 causes application hosting engine to send a command to secondary operating system 220 to launch guest chat application 324. This command is asynchronous, and the focus of primary OS 210 remains on native application 218.

Once it is launched, guest chat application 324 will receive the focus of secondary operating system 220. Application hosting engine 150 does not know when the launch of guest chat application 324 will complete, or when guest chat application 324 will receive the focus of secondary OS 220.

Figure 3B:
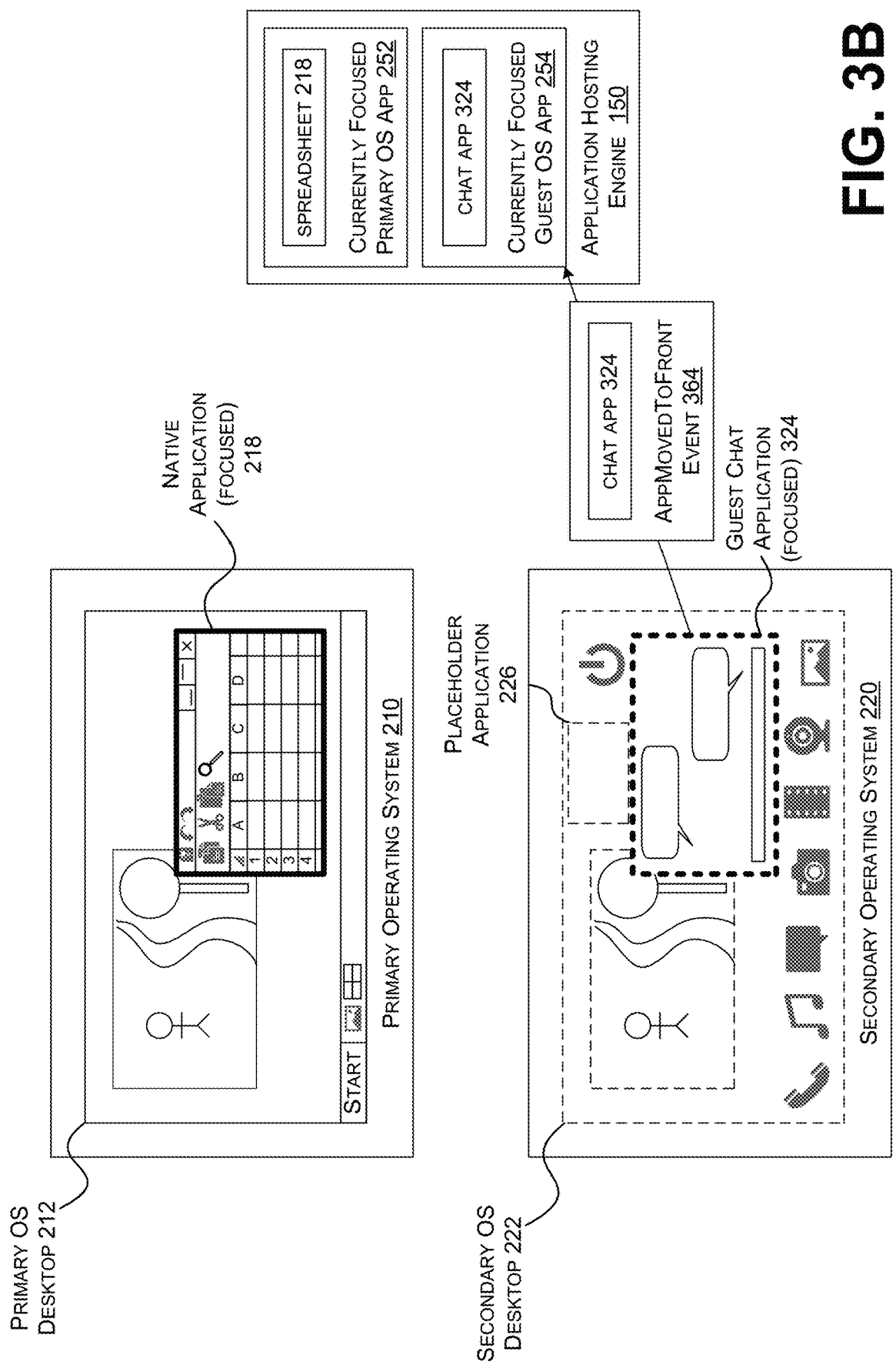
FIG. 3B illustrates the secondary operation system raising an event indicating that the guest chat application has moved to the front.

FIG. 3B illustrates the secondary operating system 220 raising an event 364 indicating that the guest chat application 324 has moved to the front—i.e., that guest chat app 324 has received the focus of secondary operating system 220. In response, application hosting engine 150 updates the value of currently focused guest OS app 254 to store a reference to chat app 324.

Figure 3C:
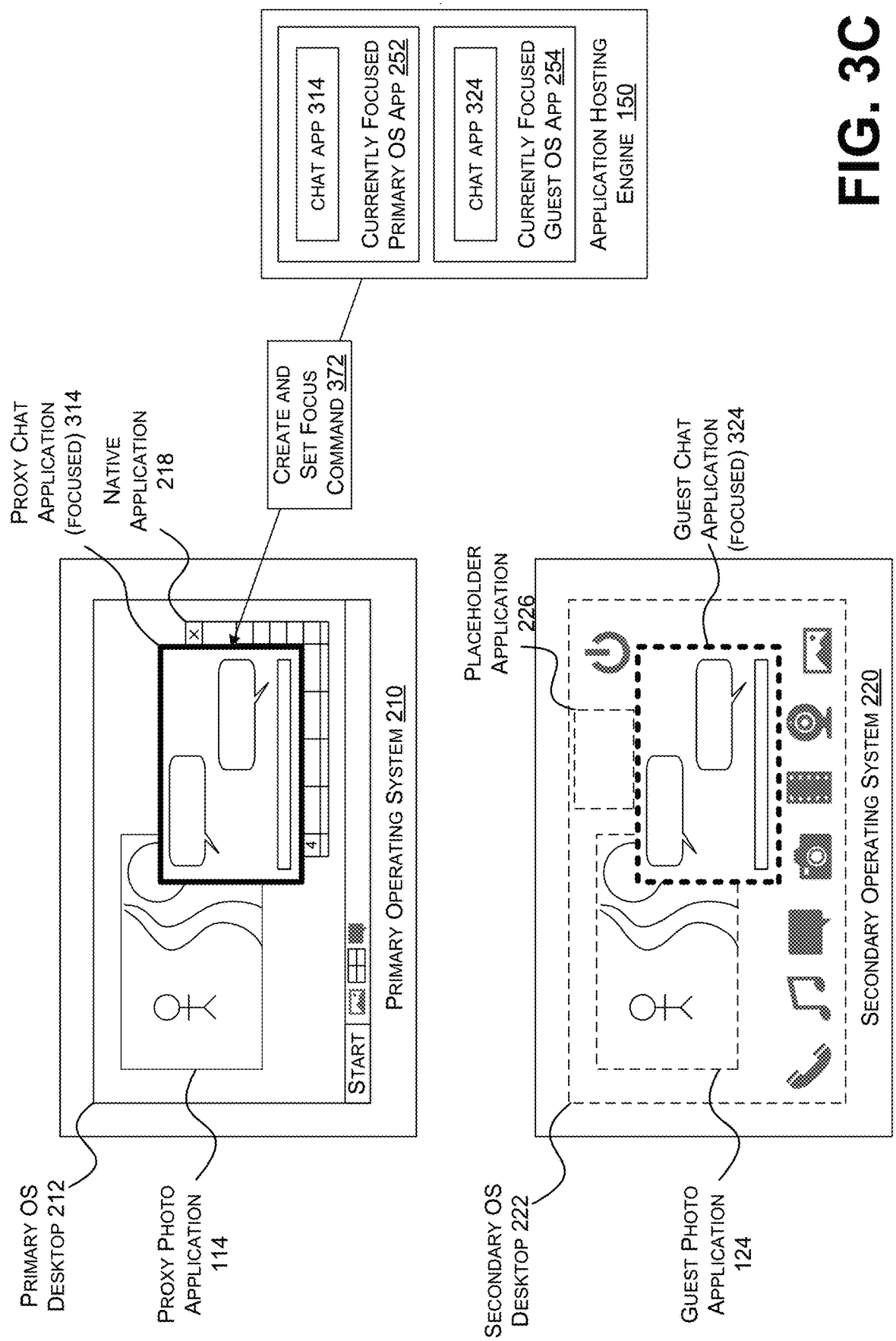
FIG. 3C illustrates the application hosting engine creating a proxy chat application for the newly launched guest chat application.

FIG. 3C illustrates the application hosting engine 150 creating a proxy chat application 314 for the newly launched guest chat application 324. Specifically, application hosting engine 150 sends a create and set focus command 372 to primary OS 210. Primary OS 210 responds by launching proxy chat application 314 and giving it focus. In some configurations, proxy chat application 314 is an instance of an application deployed with and designed to interact with application hosting engine 150 to render content generated by guest chat application 324 and to forward input commands to guest chat application 324. Focus synchronicity is maintained by ensuring that proxy chat application 314 and corresponding guest chat application 324 both have the focus of their respective operating systems.

FIG. 3C illustrates what happens when the asynchronous launching of a guest application completes and synchronizes focus with primary operating system 210 without interruption. However, it is possible that in the intervening time the focus of primary OS 210 will have changed. This scenario is discussed below in conjunction with FIGS. 4A-4C.

Figure 4A:
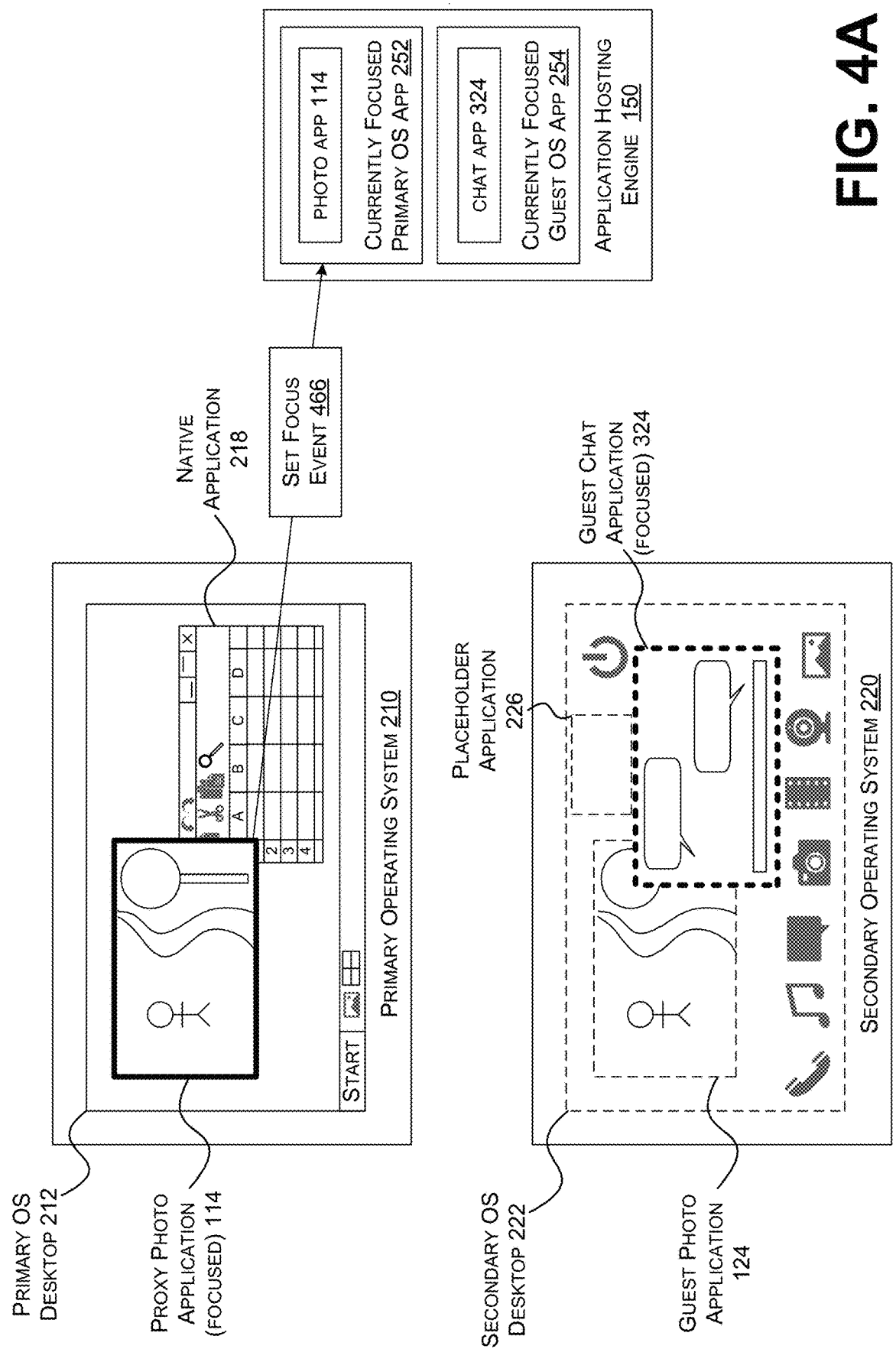
FIG. 4A illustrates what may happen after the state depicted in FIG. 3B if proxy photo application is given focus before the application hosting engine is aware that guest chat application was brought into focus.

FIG. 4A illustrates what may happen after the state depicted in FIG. 3B if proxy photo application 114 was given focus before the application hosting engine 150 is aware that guest chat application 324 was brought into focus. Specifically, a user may have clicked on proxy photo application 114 before the create and set focus command 372 was received by application hosting engine 150, or even, as illustrated, before it was sent. In response to setting the focus of primary OS 210 to proxy photo application 114, set focus event 466 is provided to application hosting engine 150. Application hosting engine 150 stores an identifier of photo app 114 in currently focused primary OS app 252. At the time depicted by FIG. 4A, the focus of secondary OS 220 remains on guest chat application 324.

Figure 4B:
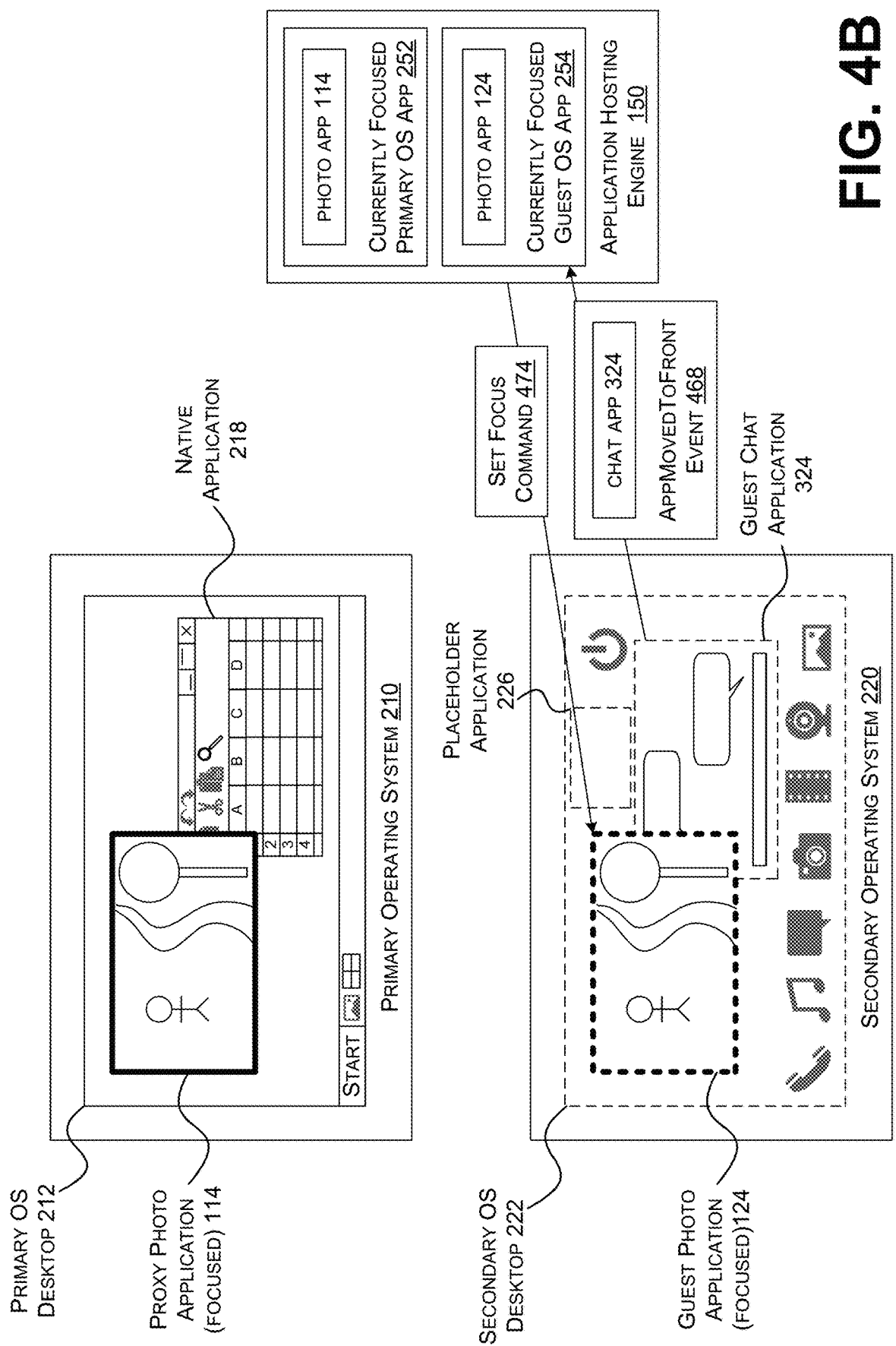
FIG. 4B illustrates application hosting engine giving the focus of the secondary operation system to the guest photo application while, concurrently, the application hosting engine is notified that the guest chat application was moved to the front.

FIG. 4B illustrates application hosting engine 150 giving the focus of secondary operation system 220 to guest photo application 124 while, concurrently, application hosting engine 150 is notified that the guest chat application was moved to the front. Set focus command 474 is sent to secondary OS 220 to give guest photo application 124 focus. This results in focus synchronicity, as guest photo application 124 and proxy photo application 114 both have focus on their respective operating systems. AppMovedToFront event 468 indicates that guest chat application 324 was moved to the front of the application stack—even though focus has since been transferred away. The order in which set focus command 474 and AppMovedToFront event 468 are processed is indeterminate. As illustrated, set focus command 474 was processed while AppMovedToFront event 468 is in flight. However, it is just as possible that AppMovedToFront event 468 was sent and even received by application hosting engine 150 before set focus command 474 was received and/or processed by secondary OS 220. In some configurations, where there is a conflict as to which application has the focus, the application focused by the primary application is chosen, and the focus of the secondary OS is set to match.

FIG. 4C illustrates creating a proxy chat application 314, without giving it focus. Proxy chat application 314 is not given focus because proxy photo application 114 was given focus by the user after launching guest chat application 324. Application hosting engine 150 sends create command 372 to primary operating system 210. Application hosting engine 150 knows that the proxy photo application 114 has the focus of primary operating system 210. Accordingly, proxy chat application 314 is created and displayed, but not given the focus of primary OS 210.

Figure 5A:
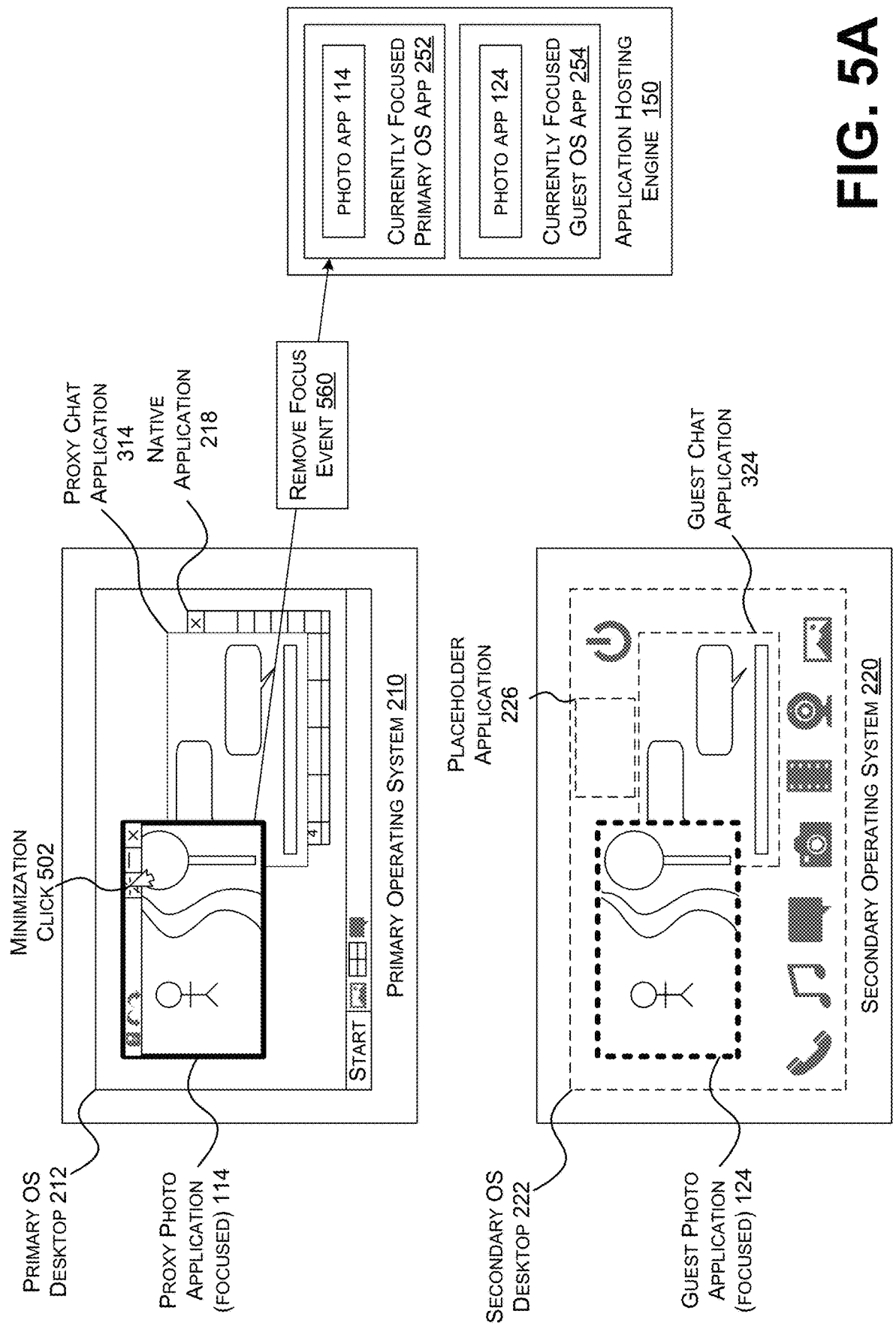
FIG. 5A illustrates minimizing proxy photo application.

FIG. 5A illustrates minimizing proxy photo application 114. Minimizing and restoring proxy applications is another scenario in which a corresponding guest application is asynchronously brought to front. Similar to the scenario in which an application is launched, there is potential for a race if the focus of the primary OS 210 changes before the guest application is restored.

As illustrated, minimization click 502 causes proxy photo application 114 to be minimized, losing focus. Primary OS 210 sends remove focus event 560 to application hosting engine 150.

Figure 5B:
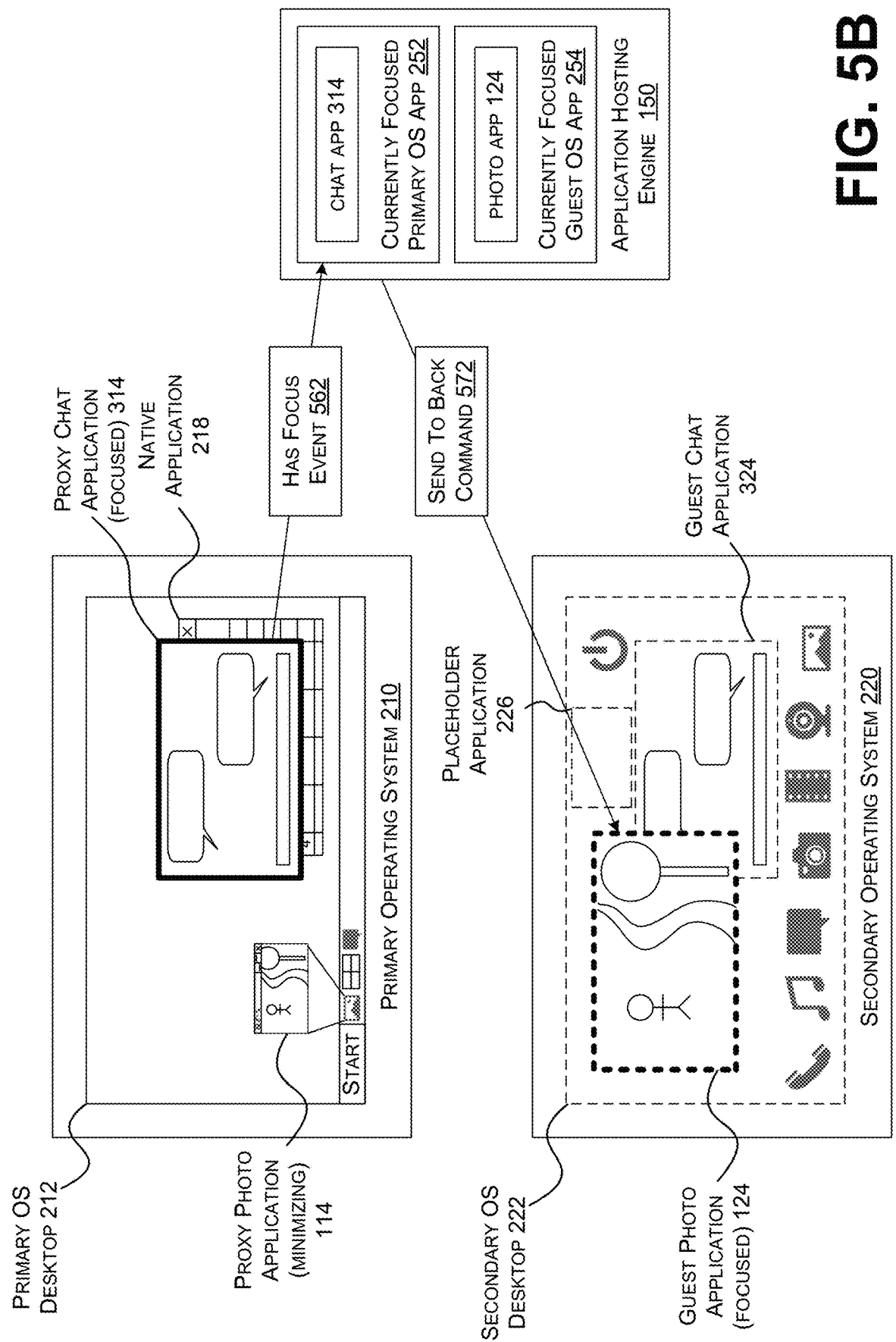
FIG. 5B illustrates the proxy chat application gaining the focus of the primary OS while sending the guest photo application to the back.

FIG. 5B illustrates the proxy chat application 314 gaining the focus of the primary OS 210 while sending the guest photo application 124 to the back. Primary OS 210 automatically gives focus to a different application when proxy photo application 114 is minimized. As illustrated, focus is returned to proxy chat application 314. Primary OS 210 sends a has focus event 562 to application hosting engine 150, indicating that proxy chat application 314 now has focus. Application hosting engine 150 updates currently focused primary OS app 252 accordingly. In response to the change in focus of primary OS 210, application hosting engine sends a send to back command 572 to secondary OS 220.

As illustrated, in some configurations, application hosting engine updates currently focused guest OS app 254 when sending the send to back command 572. In this configuration, application hosting engine 150 may also send a "send to front" command as part of or along with the send to back command 572 to indicate which application should replace guest photo application 124 as having focus. In other configurations, application hosting engine 150 waits to receive a "move app to front" event confirming that the focus has changed before performing the update.

FIG. 5C illustrates the placeholder application 226 obtaining the focus of the secondary OS 220. In response to the send to back command 572, second operating system 220 moved guest photo application 124 to the back of the application stack—i.e., guest photo application 124 now has the lowest Z order and is occluded by any overlapping windows. As illustrated, secondary OS 220 selected placeholder application 226 to receive the focus. consequently, secondary OS 220 sends AppMovedToFront event 564 to application hosting engine 150.

The scenario depicted in FIG. 5C occurs in the context of minimizing proxy photo application 114. However, there are other situations in which a guest application may unexpectedly gain the focus of secondary OS 220. For example, a pop up generated by secondary OS 220 may appear unexpectedly, such as a reminder to download a system update. The steps depicted in FIGS. 5C-5F apply to these other scenarios as well.

Figure 5D:
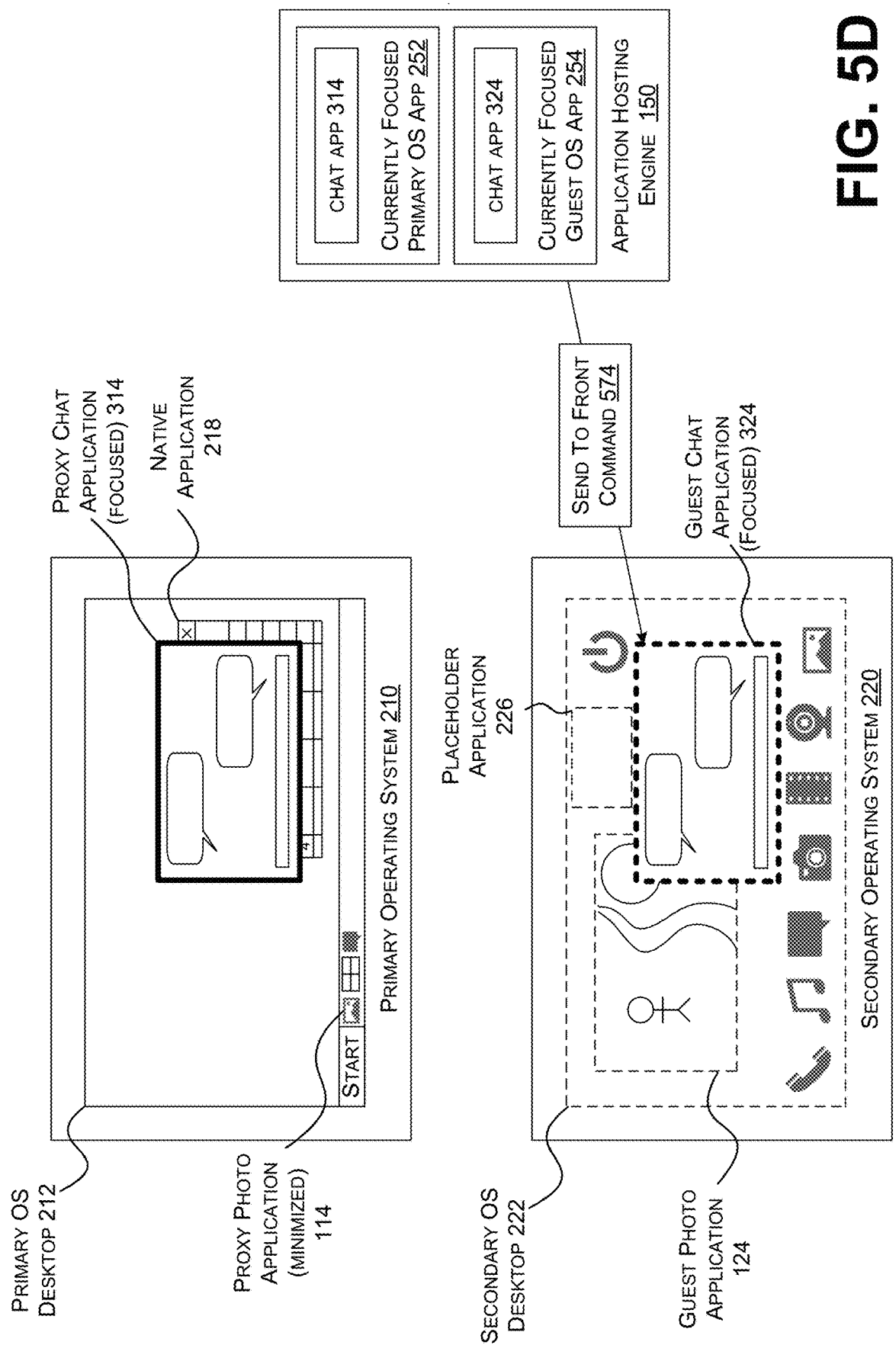
FIG. 5D illustrates giving the focus of secondary OS to the guest chat application, synchronizing focus with the primary OS.

FIG. 5D illustrates giving the focus of secondary OS 220 to the guest chat application 324, synchronizing focus with the primary OS 210. In response to the AppMovedToFront event 564, application hosting engine determines that primary OS 210 has given the focus to a proxy application—in this case proxy chat application 314. Application hosting engine 150 provides send to front command 574 to secondary OS 220, causing guest chat application 324 to obtain focus. This ensures focus synchronicity as the corresponding proxy application 314 also has focus of primary OS 210.

Allowing placeholder application 226 to continue to have focus of secondary OS 220 while proxy chat application 314 has the focus of primary OS 210 would break focus synchronicity. Specifically, focus synchronicity is achieved when a native application has the focus of primary OS 210 and placeholder application 226 has the focus of secondary OS 220. Focus synchronicity is only otherwise achieved when a guest application and corresponding proxy application have the focus of their respective operating systems. As such, allowing a proxy application to have focus in primary OS 210 while the placeholder application 226 has focus of the secondary OS 220 breaks focus synchronicity.

FIG. 5E illustrates click 522 restoring the proxy photo application 314. Restoring proxy photo application 314 brings it back into focus. Primary OS 210 provides set focus event 566 to application hosting engine 150, which updates currently focused primary OS app 252.

Figure 5F:
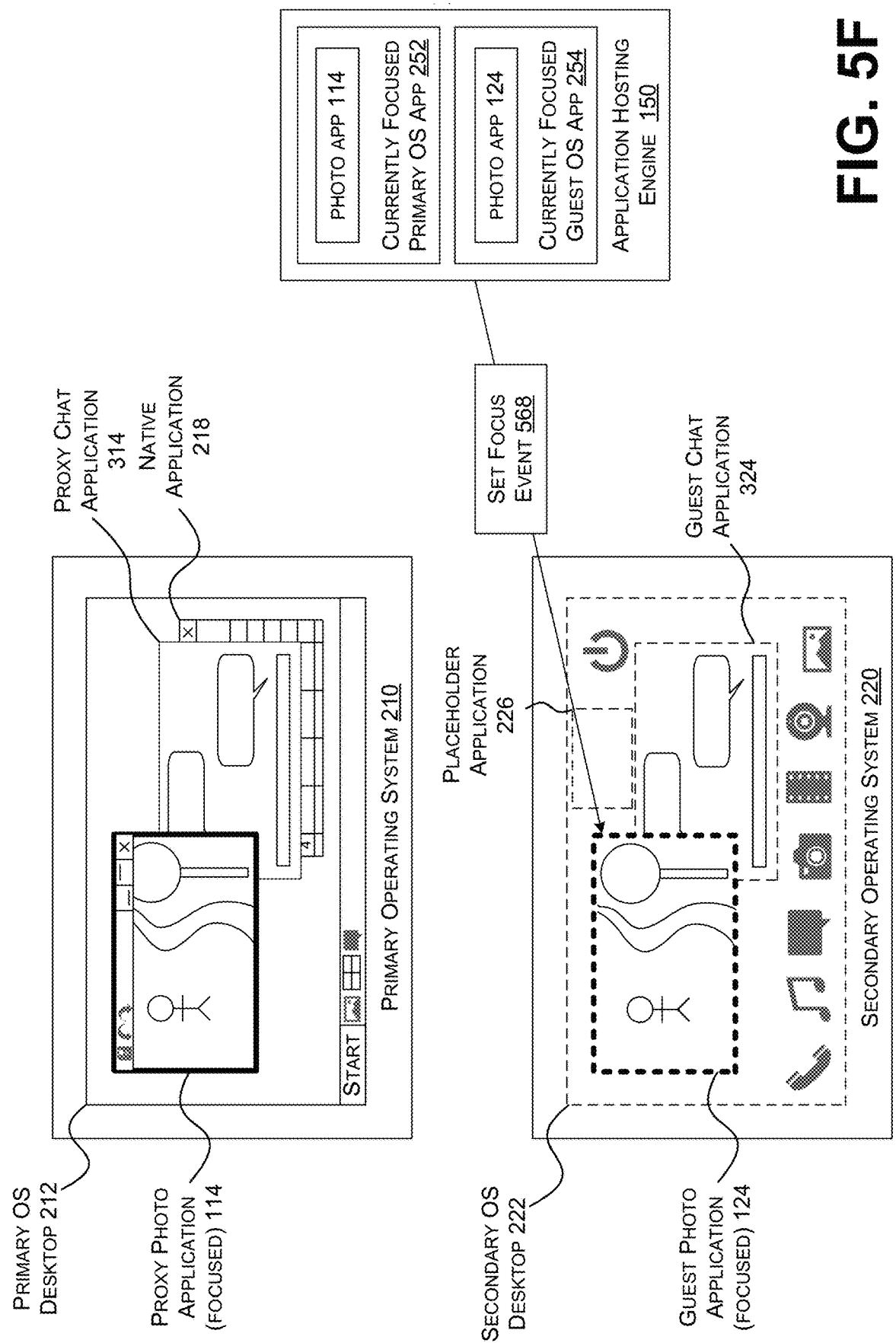
FIG. 5F illustrates synchronizing focus by setting the focus of the secondary OS to the guest photo application.

FIG. 5F illustrates synchronizing focus by setting the focus of the secondary OS 220 to the guest photo application 124. Application hosting engine 150 provides set focus event 568 to secondary OS 220, causing guest photo application 124 to be brought into focus.

Restoring a minimized proxy application introduces another race—while not depicted, a user could activate native application 218 before guest photo application 124 is brought into focus. Left unchecked, this would break focus synchronicity. In this scenario, application hosting engine 150 would detect the change in focus of the primary OS 210 and reflect this change in the secondary OS 220 by bringing placeholder application 226 back into focus.

Figure 6:
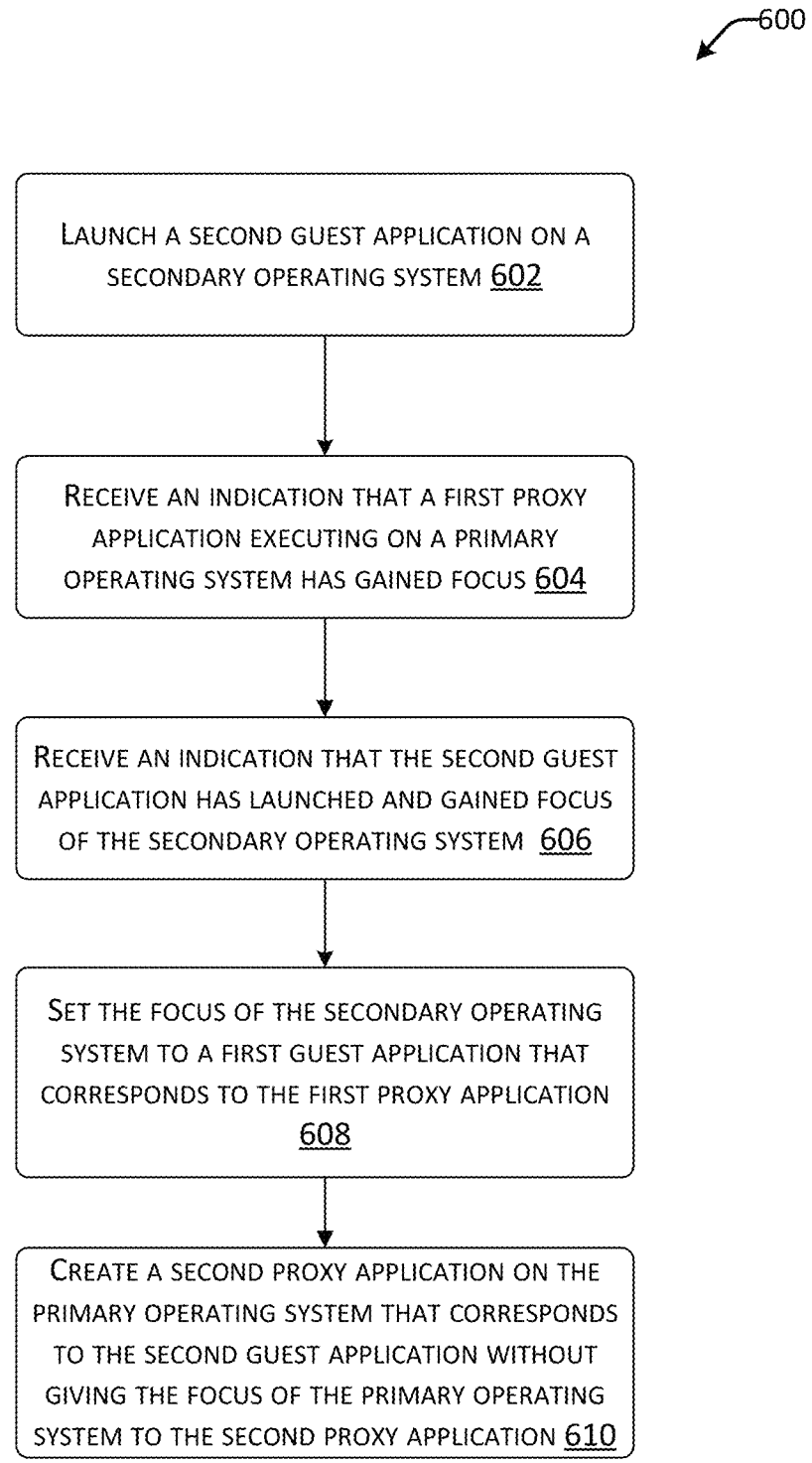
FIG. 6 is a flow diagram of an example method for synchronizing focus across incompatible operating systems.

Turning now to FIG. 6, aspects of a routine for synchronizing focus across incompatible operating systems is shown and described. For ease of understanding, the processes discussed in this disclosure are delineated as separate operations represented as independent blocks. However, these separately delineated operations should not be construed as necessarily order dependent in their performance. The order in which the process is described is not intended to be construed as a limitation, and any number of the described process blocks may be combined in any order to implement the process or an alternate process. Moreover, it is also possible that one or more of the provided operations is modified or omitted.

With reference to FIG. 6, routine 600 begins at operation 602 where a second guest application 324 is launched on secondary OS 220. The second guest application 324 may have been launched by activating icon 216, for example.

Next at operation 604, an indication 466 is received that first proxy application 114 has gained the focus of the primary operating system 210. This could happen in response to a user clicking on proxy photo application 114, for example.

Next at operation 606, an indication 364 that the second guest application 324 has gained focus of the secondary operating system 220 is received.

Next at operation 608, application hosting engine 150 sets the focus of the secondary OS 220 to a first guest application 124 that corresponds to the first proxy application 114.

Proceeding to operation 610, a second proxy application 314 is created on the primary OS 210 that corresponds to the second guest application 324 without giving focus to the second proxy application 314.

The particular implementation of the technologies disclosed herein is a matter of choice dependent on the performance and other requirements of a computing device. Accordingly, the logical operations described herein are referred to variously as states, operations, structural devices, acts, or modules. These states, operations, structural devices, acts, and modules can be implemented in hardware, software, firmware, in special-purpose digital logic, and any combination thereof. It should be appreciated that more or fewer operations can be performed than shown in the figures and described herein. These operations can also be performed in a different order than those described herein.

It also should be understood that the illustrated methods can end at any time and need not be performed in their entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the routine 600 are described herein as being implemented, at least in part, by modules running the features disclosed herein can be a dynamically linked library (DLL), a statically linked library, functionality produced by an application programing interface (API), a compiled program, an interpreted program, a script or any other executable set of instructions. Data can be stored in a data structure in one or more memory components. Data can be retrieved from the data structure by addressing links or references to the data structure.

Although the following illustration refers to the components of the figures, it should be appreciated that the operations of the routine 600 may be also implemented in many other ways. For example, the routine 600 may be implemented, at least in part, by a processor of another remote computer or a local circuit. In addition, one or more of the operations of the routine 600 may alternatively or additionally be implemented, at least in part, by a chipset working alone or in conjunction with other software modules. In the example described below, one or more modules of a computing system can receive and/or process the data disclosed herein. Any service, circuit or application suitable for providing the techniques disclosed herein can be used in operations described herein.

Figure 7:
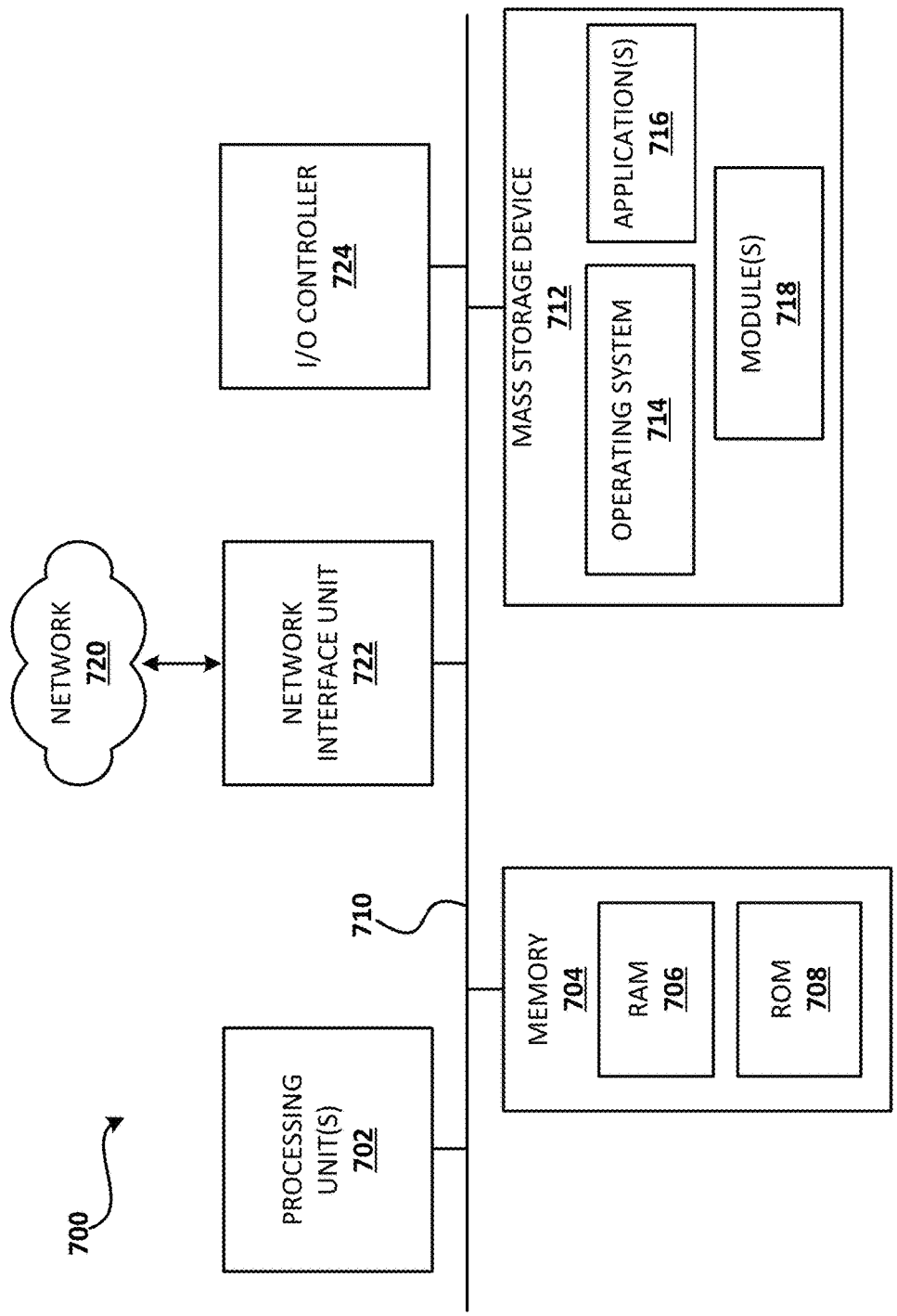
FIG. 7 is a computer architecture diagram illustrating an illustrative computer hardware and software architecture for a computing system capable of implementing aspects of the techniques and technologies presented herein.

FIG. 7 shows additional details of an example computer architecture 700 for a device, such as a computer or a server configured as part of the systems described herein, capable of executing computer instructions (e.g., a module or a program component described herein). The computer architecture 700 illustrated in FIG. 7 includes processing unit(s) 702, a system memory 704, including a random-access memory 706 ("RAM") and a read-only memory ("ROM") 708, and a system bus 710 that couples the memory 704 to the processing unit(s) 702.

Processing unit(s), such as processing unit(s) 702, can represent, for example, a CPU-type processing unit, a GPU-type processing unit, a field-programmable gate array (FPGA), another class of digital signal processor (DSP), or other hardware logic components that may, in some instances, be driven by a CPU. For example, and without limitation, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), etc.

A basic input/output system containing the basic routines that help to transfer information between elements within the computer architecture 700, such as during startup, is stored in the ROM 708. The computer architecture 700 further includes a mass storage device 712 for storing an operating system 714, application(s) 716, modules 718, and other data described herein.

The mass storage device 712 is connected to processing unit(s) 702 through a mass storage controller connected to the bus 710. The mass storage device 712 and its associated computer-readable media provide non-volatile storage for the computer architecture 700. Although the description of computer-readable media contained herein refers to a mass storage device, it should be appreciated by those skilled in the art that computer-readable media can be any available computer-readable storage media or communication media that can be accessed by the computer architecture 700.

Computer-readable media can include computer-readable storage media and/or communication media. Computer-readable storage media can include one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random access memory (RAM), static random-access memory (SRAM), dynamic random-access memory (DRAM), phase change memory (PCM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer-readable storage media, communication media can embody computer-readable instructions, data structures, program modules, or other data in a modulated data signal, such as a carrier wave, or other transmission mechanism. As defined herein, computer storage media does not include communication media. That is, computer-readable storage media does not include communications media consisting solely of a modulated data signal, a carrier wave, or a propagated signal, per se.

According to various configurations, the computer architecture 700 may operate in a networked environment using logical connections to remote computers through the network 720. The computer architecture 700 may connect to the network 720 through a network interface unit 722 connected to the bus 710. The computer architecture 700 also may include an input/output controller 724 for receiving and processing input from a number of other devices, including a keyboard, mouse, touch, or electronic stylus or pen. Similarly, the input/output controller 724 may provide output to a display screen, a printer, or other type of output device.

It should be appreciated that the software components described herein may, when loaded into the processing unit(s) 702 and executed, transform the processing unit(s) 702 and the overall computer architecture 700 from a general-purpose computing system into a special-purpose computing system customized to facilitate the functionality presented herein. The processing unit(s) 702 may be constructed from any number of transistors or other discrete circuit elements, which may individually or collectively assume any number of states. More specifically, the processing unit(s) 702 may operate as a finite-state machine, in response to executable instructions contained within the software modules disclosed herein. These computer-executable instructions may transform the processing unit(s) 702 by specifying how the processing unit(s) 702 transition between states, thereby transforming the transistors or other discrete hardware elements constituting the processing unit(s) 702.

Figure 8:
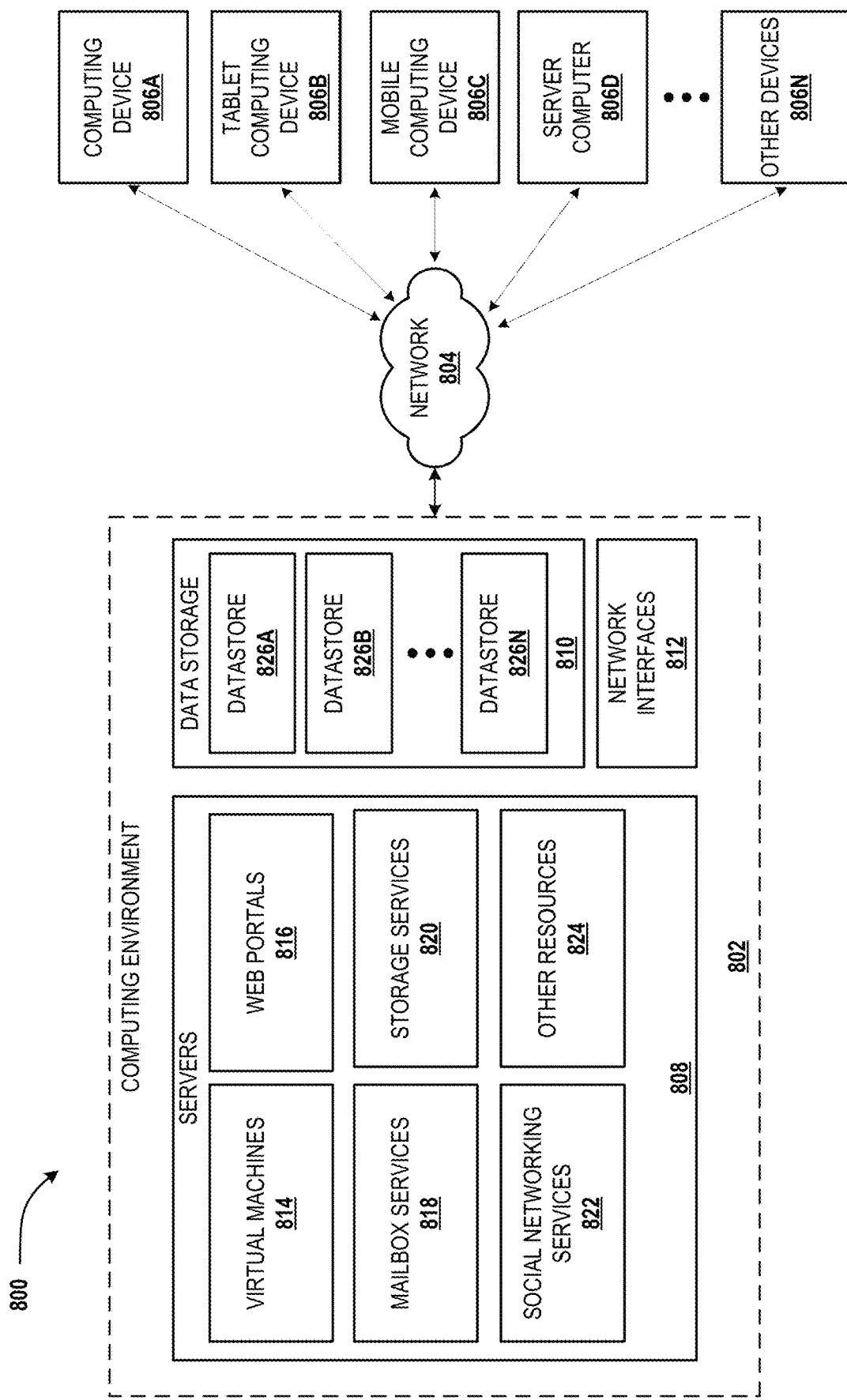
FIG. 8 is a diagram illustrating a distributed computing environment capable of implementing aspects of the techniques and technologies presented herein.

FIG. 8 depicts an illustrative distributed computing environment 800 capable of executing the software components described herein. Thus, the distributed computing environment 800 illustrated in FIG. 8 can be utilized to execute any aspects of the software components presented herein. For example, the distributed computing environment 800 can be utilized to execute aspects of the software components described herein.

Accordingly, the distributed computing environment 800 can include a computing environment 802 operating on, in communication with, or as part of the network 804. The network 804 can include various access networks. One or more client devices 806A-806N (hereinafter referred to collectively and/or generically as "clients 806" and also referred to herein as computing devices 806) can communicate with the computing environment 802 via the network 804. In one illustrated configuration, the clients 806 include a computing device 806A such as a laptop computer, a desktop computer, or other computing device; a slate or tablet computing device ("tablet computing device") 806B; a mobile computing device 806C such as a mobile telephone, a smart phone, or other mobile computing device; a server computer 806D; and/or other devices 806N. It should be understood that any number of clients 806 can communicate with the computing environment 802.

In various examples, the computing environment 802 includes servers 808, data storage 810, and one or more network interfaces 812. The servers 808 can host various services, virtual machines, portals, and/or other resources. In the illustrated configuration, the servers 808 host virtual machines 814, Web portals 816, mailbox services 818, storage services 820, and/or, social networking services 822. As shown in FIG. 8 the servers 808 also can host other services, applications, portals, and/or other resources ("other resources") 824.

As mentioned above, the computing environment 802 can include the data storage 810. According to various implementations, the functionality of the data storage 810 is provided by one or more databases operating on, or in communication with, the network 804. The functionality of the data storage 810 also can be provided by one or more servers configured to host data for the computing environment 802. The data storage 810 can include, host, or provide one or more real or virtual datastores 826A-826N (hereinafter referred to collectively and/or generically as "datastores 826"). The datastores 826 are configured to host data used or created by the servers 808 and/or other data. That is, the datastores 826 also can host or store web page documents, word documents, presentation documents, data structures, algorithms for execution by a recommendation engine, and/or other data utilized by any application program. Aspects of the datastores 826 may be associated with a service for storing files.

The computing environment 802 can communicate with, or be accessed by, the network interfaces 812. The network interfaces 812 can include various types of network hardware and software for supporting communications between two or more computing devices including, but not limited to, the computing devices and the servers. It should be appreciated that the network interfaces 812 also may be utilized to connect to other types of networks and/or computer systems.

It should be understood that the distributed computing environment 800 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 800 provides the software functionality described herein as a service to the computing devices. It should be understood that the computing devices can include real or virtual machines including, but not limited to, server computers, web servers, personal computers, mobile computing devices, smart phones, and/or other devices. As such, various configurations of the concepts and technologies disclosed herein enable any device configured to access the distributed computing environment 800 to utilize the functionality described herein for providing the techniques disclosed herein, among other aspects.

The present disclosure is supplemented by the following example clauses.

Example 1: A method comprising: initiating (302, 502) an asynchronous operation on a secondary operating system (220) that sets a focus of the secondary operating system (220) to a guest application (324); before the asynchronous operation completes, receiving an indication (466) that an application (114, 218) running on a primary operating system (210) has gained a focus of the primary operating system (210); receiving an indication (364) that the guest application (324) has gained the focus of the secondary operating system (220); and in response to the indication (364) that the guest application (324) has gained the focus of the secondary operating system (220), setting the focus of the secondary operating system (220) to another application (124, 226) running on the secondary operating system (220) that corresponds to the application (114, 218) running on the primary operating system (210).

Example 2: The method of Example 1, wherein the asynchronous operation comprises launching the guest application.

Example 3: The method of Example 2, further comprising: creating a proxy application running on the primary operating system that corresponds to the guest application without giving the focus of the primary operating system to the proxy application, wherein content generated by the guest application is rendered by the proxy application and wherein user interface commands received by the proxy application are forwarded to the guest application.

Example 4: The method of Example 1, wherein the asynchronous operation comprises restoring the guest application from a minimized state.

Example 5: The method of Example 1, wherein the application running on the primary operating system comprises a second proxy application, and wherein the other application running on the secondary operating system comprises a second guest application.

Example 6: The method of Example 1, wherein the application running on the primary operating system comprises a native application, and wherein the other application running on the secondary operating system comprises a placeholder application.

Example 7: The method of Example 6, wherein the placeholder application receives user interface events originating from the secondary operating system.

Example 8: The method of Example 1, wherein the primary operating system runs on a computing device, wherein the secondary operating system comprises a guest operating system running on a virtual machine, and wherein the virtual machine runs on the computing device.

Example 9: The method of Example 1, wherein the asynchronous operation is initiated in response to user input received by the primary operating system.

Example 10: The method of Example 1, further comprising: registering to receive an indication when an individual application gains a focus of a secondary operating system.

Example 11: A computing device comprising: one or more processors; a memory in communication with the one or more processors, the memory having computer-readable instructions stored thereupon which, when executed by the one or more processors, cause the computing device to: register to receive indications when a focus of a secondary operating system (220) changes, wherein a proxy application (114) having a focus of a primary operating system (210) displays content rendered by a guest application (124) that has the focus of the secondary operating system (210), and wherein user interface commands received by the proxy application (114) are forwarded to the guest application (124); receiving an indication that the focus of the secondary operating system (220) changed; and setting the focus of the secondary operating system (220) to the guest application (124).

Example 12: The computing device of Example 11, wherein the indication that the focus of the secondary operating system changed is received from the secondary operating system.

Example 13: The computing device of Example 11, wherein the focus of the secondary operating system is set back to the guest application in response to a determination that the proxy application continues to have the focus of the primary operating system.

Example 14: The computing device of Example 11, wherein the focus of the secondary operating system changed to an application launched independently by the secondary operating system.

Example 15: A computer-readable storage medium comprising instructions that, when executed by a processor, cause the processor to: receive an indication of a focus of a primary operating system (210) changing from a proxy application (114) to a native application (218), wherein the proxy application (114) displays content rendered by a guest application (124) having the focus of the secondary operating system (210) and wherein user interface commands received by the proxy application (114) are forwarded to the guest application (124) when the guest application (124) has the focus of the secondary operating system (220); and setting a focus of the secondary operating system (220) to a placeholder application.

Example 16: The computer-readable storage medium of Example 15, wherein the instructions further cause the processor to: launch the placeholder application on the secondary operating system.

Example 17: The computer-readable storage medium of Example 15, wherein the native application does not proxy a guest application running in the secondary operating system.

Example 18: The computer-readable storage medium of Example 15, wherein user interface events of the secondary operating system are sent to the placeholder application while the placeholder application has the focus of the secondary operating system.

Example 19: The computer-readable storage medium of Example 15, wherein the instructions further cause the processor to: receive an indication that the proxy application has the focus of the primary operating system; and set the focus of the secondary operating system to the guest application.

Example 20: The computer-readable storage medium of Example 15, wherein an individual application having the focus of the primary operating system is provided with user input received by the primary operating system.

While certain example embodiments have been described, these embodiments have been presented by way of example only and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be appreciated that any reference to "first," "second," etc. elements within the Summary and/or Detailed Description is not intended to and should not be construed to necessarily correspond to any reference of "first," "second," etc. elements of the claims. Rather, any use of "first" and "second" within the Summary, Detailed Description, and/or claims may be used to distinguish between two different instances of the same element.

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A method comprising:
   initiating an asynchronous operation on a secondary operating system that sets a focus of the secondary operating system to a guest application;
   receiving an indication that an application running on a primary operating system has gained a focus of the primary operating system, wherein the application running on the primary operating system is not a proxy application of the guest application;
   receiving an indication that the guest application has gained the focus of the secondary operating system while the application running on the primary operating system has the focus of the primary operating system; and
   in response to the indication that the guest application has gained the focus of the secondary operating system, setting the focus of the secondary operating system to another application running on the secondary operating system that corresponds to the application running on the primary operating system.

2. The method of claim 1, wherein the asynchronous operation comprises launching the guest application.

3. The method of claim 2, further comprising:
   creating a proxy application running on the primary operating system that corresponds to the guest application without giving the focus of the primary operating system to the proxy application, wherein content generated by the guest application is rendered by the proxy application and wherein user interface commands received by the proxy application are forwarded to the guest application.

4. The method of claim 1, wherein the asynchronous operation comprises restoring the guest application from a minimized state.

5. The method of claim 1, wherein the application running on the primary operating system comprises a second proxy application, and wherein the other application running on the secondary operating system comprises a second guest application.

6. The method of claim 1, wherein the application running on the primary operating system comprises a native application, and wherein the other application running on the secondary operating system comprises a placeholder application.

7. The method of claim 6, wherein the placeholder application receives user interface events originating from the secondary operating system.

8. The method of claim 1, wherein the primary operating system runs on a computing device, wherein the secondary operating system comprises a guest operating system running on a virtual machine, and wherein the virtual machine runs on the computing device.

9. The method of claim 1, wherein the asynchronous operation is initiated in response to user input received by the primary operating system.

10. The method of claim 1, further comprising:
    registering to receive an indication when an individual application gains a focus of a secondary operating system.

11. A computing device comprising:
    one or more processors;
    a memory in communication with the one or more processors, the memory having computer-readable instructions stored thereupon which, when executed by the one or more processors, cause the computing device to:
    register to receive indications when a focus of a secondary operating system changes, wherein a proxy application having a focus of a primary operating system displays content rendered by a guest application that has the focus of the secondary operating system, and wherein user interface commands received by the proxy application are forwarded to the guest application;
    receiving an indication that the focus of the secondary operating system changed while the proxy application retains the focus of the primary operating system; and
    setting the focus of the secondary operating system to the guest application.

12. The computing device of claim 11, wherein the indication that the focus of the secondary operating system changed is received from the secondary operating system.

13. The computing device of claim 11, wherein the focus of the secondary operating system is set back to the guest application in response to a determination that the proxy application continues to have the focus of the primary operating system.

14. The computing device of claim 11, wherein the focus of the secondary operating system changed to an application launched independently by the secondary operating system.

15. A computer-readable storage medium comprising instructions that, when executed by a processor, cause the processor to:

receive an indication of a focus of a primary operating system changing from a proxy application to a native application, wherein the proxy application displays content rendered by a guest application having the focus of the secondary operating system and wherein user interface commands received by the proxy application are forwarded to the guest application when the guest application has the focus of the secondary operating system; and setting a focus of the secondary operating system to a placeholder application in response to the focus of the primary operating system changing from the proxy application to the native application.

16. The computer-readable storage medium of claim 15, wherein the instructions further cause the processor to:

launch the placeholder application on the secondary operating system.

17. The computer-readable storage medium of claim 15, wherein the native application does not proxy a guest application running in the secondary operating system.

18. The computer-readable storage medium of claim 15, wherein user interface events of the secondary operating system are sent to the placeholder application while the placeholder application has the focus of the secondary operating system.

19. The computer-readable storage medium of claim 15, wherein the instructions further cause the processor to:

receive an indication that the proxy application has the focus of the primary operating system; and set the focus of the secondary operating system to the guest application.

20. The computer-readable storage medium of claim 15, wherein an individual application having the focus of the primary operating system is provided with user input received by the primary operating system.

\* \* \* \* \*